(12) United States Patent
Fu et al.

(10) Patent No.: US 10,999,327 B2
(45) Date of Patent: May 4, 2021

(54) POLICY DEPLOYMENT METHOD, APPARATUS, SYSTEM AND COMPUTING SYSTEM OF TRUSTED SERVER

(71) Applicant: Alibaba Group Holding Limited, Grand Cayman (KY)

(72) Inventors: Yingfang Fu, Beijing (CN); Peng Xiao, Beijing (CN)

(73) Assignee: Alibaba Group Holding Limited, Grand Cayman (KY)

(*) Notice: Subject to any disclaimer, the term of this patent is extended or adjusted under 35 U.S.C. 154(b) by 105 days.

(21) Appl. No.: 16/206,923

(22) Filed: Nov. 30, 2018

(65) Prior Publication Data
US 2019/0190954 A1 Jun. 20, 2019

(30) Foreign Application Priority Data
Oct. 26, 2017 (CN) .......................... 201711019378.6

(51) Int. Cl.
*H04L 29/06* (2006.01)
*H04L 9/32* (2006.01)
(Continued)

(52) U.S. Cl.
CPC ............ *H04L 63/20* (2013.01); *G06F 21/577* (2013.01); *H04L 9/30* (2013.01); *H04L 9/321* (2013.01);
(Continued)

(58) Field of Classification Search
CPC ....... H04L 63/20; H04L 63/0428; H04L 9/30; H04L 9/321; H04L 9/3268; H04L 41/0893; G06F 21/577
See application file for complete search history.

(56) References Cited

U.S. PATENT DOCUMENTS 8,266,676 B2 * 9/2012 Hardjono ............ H04L 63/0823
726/3
8,375,221 B1 2/2013 Thom et al.
(Continued)

FOREIGN PATENT DOCUMENTS

WO WO2008024135 A2 2/2008

OTHER PUBLICATIONS

The PCT Search Report and Written Opinion dated Feb. 28, 2019 for PCT Application No. PCT/US2018/063473, 10 pages.

*Primary Examiner* — Sher A Khan
(74) *Attorney, Agent, or Firm* — Lee & Hayes, P.C.

(57) ABSTRACT

A method, an apparatus, a system and a computing system for policy deployment of a trusted server are provided. The method includes sending a metric policy of at least one metric object and a verification policy of at least one verification object in a process of policy deployment of a trusted server to a service center; the trusted server receiving reminder information returned by the service center, wherein the reminder information is used for representing a reminder to the trusted server to redeploy a metric algorithm and a verification algorithm that are consistent if a metric algorithm of a metric object is detected to be inconsistent with a verification algorithm of a corresponding verification object. The present disclosure solves the technical problems of poor independence and flexibility due to the use of a same metric algorithm for all metric objects by existing trusted server policy management solutions.

15 Claims, 18 Drawing Sheets

(51) Int. Cl.
  *H04L 9/30* (2006.01)
  *G06F 21/57* (2013.01)
  *H04L 12/24* (2006.01)

(52) U.S. Cl.
  CPC ........ *H04L 9/3268* (2013.01); *H04L 41/0893* (2013.01); *H04L 63/0428* (2013.01); *G06F 2221/2135* (2013.01)

(56) References Cited

U.S. PATENT DOCUMENTS

| | | | |
|---|---|---|---|
| 8,707,409 B2 | 4/2014 | Shah et al. | |
| 8,738,932 B2 | 5/2014 | Lee et al. | |
| 8,843,997 B1 | 9/2014 | Hare | |
| 9,135,444 B2 | 9/2015 | Carter et al. | |
| 9,854,002 B1* | 12/2017 | Streete | H04L 63/10 |
| 10,169,571 B1* | 1/2019 | Attfield | H04L 63/0272 |
| 10,270,748 B2 | 4/2019 | Briceno et al. | |
| 10,491,594 B2 | 11/2019 | Yan | |
| 2002/0038291 A1* | 3/2002 | Petersen | G06F 21/33 705/67 |
| 2005/0132229 A1 | 6/2005 | Zhang et al. | |
| 2008/0046898 A1 | 2/2008 | Molina et al. | |
| 2009/0210520 A1* | 8/2009 | Maeno | H04L 41/0866 709/221 |
| 2010/0082991 A1* | 4/2010 | Baldwin | H04L 9/083 713/176 |
| 2011/0010543 A1 | 1/2011 | Schmidt et al. | |
| 2012/0221955 A1* | 8/2012 | Raleigh | H04L 12/1485 715/736 |
| 2013/0085799 A1* | 4/2013 | Zhang | G06Q 10/00 705/7.26 |
| 2015/0195858 A1 | 7/2015 | Jin et al. | |
| 2016/0099969 A1* | 4/2016 | Angus | H04L 9/3268 713/158 |
| 2016/0255505 A1* | 9/2016 | Oberheide | G06Q 20/32 726/7 |
| 2017/0147331 A1 | 5/2017 | Liem et al. | |

* cited by examiner

POLICY DEPLOYMENT METHOD, APPARATUS, SYSTEM AND COMPUTING SYSTEM OF TRUSTED SERVER

CROSS REFERENCE TO RELATED PATENT APPLICATIONS

This application claims priority to Chinese Patent Application No. 201711019378.6, filed on 26 Oct. 2017, entitled "Policy Deployment Method, Apparatus, System and Computing System of Trusted Server," which is hereby incorporated by reference in its entirety.

TECHNICAL FIELD

The present disclosure relates to the field of information system security, and particularly to policy deployment methods, apparatuses, systems, and computing systems of trusted servers.

BACKGROUND

Network security problems of computer-based information systems have become increasingly prominent. Conventional technologies such as firewall, intrusion detection, anti-virus are passive protection technologies, basically cannot solve security problems. Trusted computing can build a trusted information system by strengthening computer system architecture to proactively defend against information security threats. A principle of the trusted computing is to first add a trusted module (TPM) on a hardware platform, and build a trust root using the trusted module. The trusted root gradually extends its trust to an entire platform of a system by means of a chain of trust, and hardware technologies and software technologies are combined with each other to take measures comprehensively for improving the security of computer systems.

A trusted metric, a trusted storage, and a trusted report are three functions of the trusted computing. The trusted storage protects a result of the trusted metric and the result of trusted metric is submitted by the trusted report. As can be seen, the trusted metric is the core of the trusted computing. Currently, most OEM manufacturers use a mechanism based on integrity metrics. The integrity metrics based mechanism adopted by these manufacturers adopts a single metric algorithm for all metric objects (including, but not limited to, firmware, hardware drivers, system software, application software, etc. in a system), so that a service party cannot flexibly and independently deploy different metric policies and verification policies targeted for different metric objects according to service needs. In addition, since a metric algorithm and metric objects of a metric policy determine a metric algorithm and metric objects of a verification policy, a deployment, an update and a deletion of strict hierarchical relationships of a trust-related policy are not independent and flexible. As can be seen, solutions of deployment of existing trusted server policies require a service party to spend a lot of time and effort to manage the trusted server policies, making it unable to be dissociated from the cumbersome deployment of trust-related policies and to pay attention to their own applications in a better way.

The above-mentioned existing solutions of trusted server policy management adopt the same metric algorithm for all metric objects, leading to problems of poor independence and flexibility. Currently, no effective solution has been proposed.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Embodiments of the present disclosure provide methods, apparatuses, systems, and computing systems for a trusted server, to solve at least the technical problems of poor independence and flexibility due to an employment of a same metric algorithm for all metric objects by existing trusted server policy management solutions.

According to the embodiments of the present disclosure, a method for policy deployment of a trusted server is provided, which includes sending a metric policy of at least one metric object and a verification policy of at least one verification object in a process of policy deployment of a trusted server to a service center; the trusted server receiving reminder information returned by the service center, wherein the reminder information is used for representing a reminder to the trusted server to redeploy a metric algorithm and a verification algorithm that are consistent if a metric algorithm of a metric object is detected to be inconsistent with a verification algorithm of a corresponding verification object.

According to the embodiments of the present disclosure, a method for policy deployment of a trusted server is further provided, which includes a service center receiving a metric policy of at least one metric object and a verification policy of at least one verification object; and the service center sending reminder information to a trusted server if detecting a metric algorithm of a metric object is inconsistent with a verification algorithm of a corresponding verification object, wherein the reminder information is used for reminding the trusted server to redeploy a metric algorithm and a verification algorithm that are consistent.

According to the embodiments of the present disclosure, a method for policy deployment of a trusted server is further provided, which include at least one trusted server sending a policy deployment request to a service center; and the trusted server receiving a policy that needs to be deployed from the service center and performing a process of deploying the policy upon determining a transmission channel between the trusted server and the service center is secure.

According to the embodiments of the present disclosure, a policy deployment system of a trusted server is further provided, which includes a trusted server configured to send a metric policy of at least one metric object and a verification policy of at least one verification object; and a service center configured to communicate with the trusted server, and send reminder information to the trusted server if detecting that a metric algorithm of a metric object is inconsistent with a verification algorithm of a corresponding verification object, wherein the reminder information is used for reminding the trusted server to redeploy a metric algorithm and a verification algorithm that are consistent.

According to the embodiments of the present disclosure, a policy deployment system of a trusted server is further provided, which includes a trusted server configured to send a policy deployment request to a service center; and the service center configured to communicate with the trusted server, and return a policy that needs to be deployed to the trusted server upon determining that a transmission channel between the trusted server and the service center is secure, wherein the trusted server is further configured to send a metric policy of at least one metric object and a verification policy of at least one verification object during a process of deployment, and the service center is further configured to send reminder information to the trusted server if a metric algorithm of a metric object is inconsistent with a verification algorithm of a corresponding verification object, wherein the reminder information is used for reminding the trusted server to redeploy a metric algorithm and a verification algorithm that are consistent.

According to the embodiments of the present disclosure, a policy deployment system of a trusted server is further provided, which includes a service center; and at least one trusted server, which is connected to the service center, and is used for sending a policy deployment request to the service center, receiving a policy that needs to be deployed from the service center upon determining a transmission channel between the trusted server and the service center is secure, and performing a process of deploying the policy.

According to the embodiments of the present disclosure, a storage media is also provided. The storage media includes a stored program, wherein a device in which the storage media is located is controlled to perform any one of the foregoing methods of policy deployment of a trusted server when the program is running.

According to the embodiments of the present disclosure, a computing device is further provided. The computing device is used for running a program, wherein the program, when running, performs any one of the foregoing methods of policy deployment of a trusted server.

According to the embodiments of the present disclosure, a system is also provided, which includes processor(s); and memory coupled to the processor(s) and configured to provide the processor(s) with instructions to process the following operations: sending a metric policy of at least one metric object and a verification policy of at least one verification object to a service center in a process of policy deployment of a trusted server; the trusted server receiving reminder information returned by the service center, wherein the reminder information is used for representing a reminder to the trusted server to redeploy a metric algorithm and a verification algorithm that are consistent if a metric algorithm of a metric object is detected to be inconsistent with a verification algorithm of a corresponding verification object.

According to the embodiments of the present disclosure, a computing system is also provided, which includes a first computing device; and a trusted server coupled to the first computing device and configured to send a deployment request to the first computing device, receive a policy that needs to be deployed from the first computing device upon determining that a transmission channel between the trusted server and the first computing device is secure, and perform a deployment of the policy.

In the embodiments of the present disclosure, a metric policy of at least one metric object and a verification policy of at least one verification object are sent to a service center in a process of policy deployment of a trusted server. The trusted server receives reminder information returned by the service center. The reminder information is used for representing a reminder to the trusted server to redeploy a metric algorithm and a verification algorithm that are consistent if a metric algorithm of a metric object is detected to be inconsistent with a verification algorithm of a corresponding verification object. As such, the purpose of centralized management of automatic configuration of metric policies and verification policies of trusted software and hardware on multiple trusted servers is achieved, thus realizing technical effects of saving time and effort of service party of each service trusted server, and thereby solving the technical problems of poor independence and flexibility due to an employment of a same metric algorithm for all metric objects by existing trusted server policy management solutions.

BRIEF DESCRIPTION OF THE DRAWINGS

Drawings described herein are used for providing a further understanding of the present disclosure, and are constituted as a part of the present disclosure. The illustrative embodiments of the present disclosure and a description thereof are used for explaining the present disclosure and do not constitute improper limitations of the present disclosure. In the drawing.

DETAILED DESCRIPTION

Figure 1:
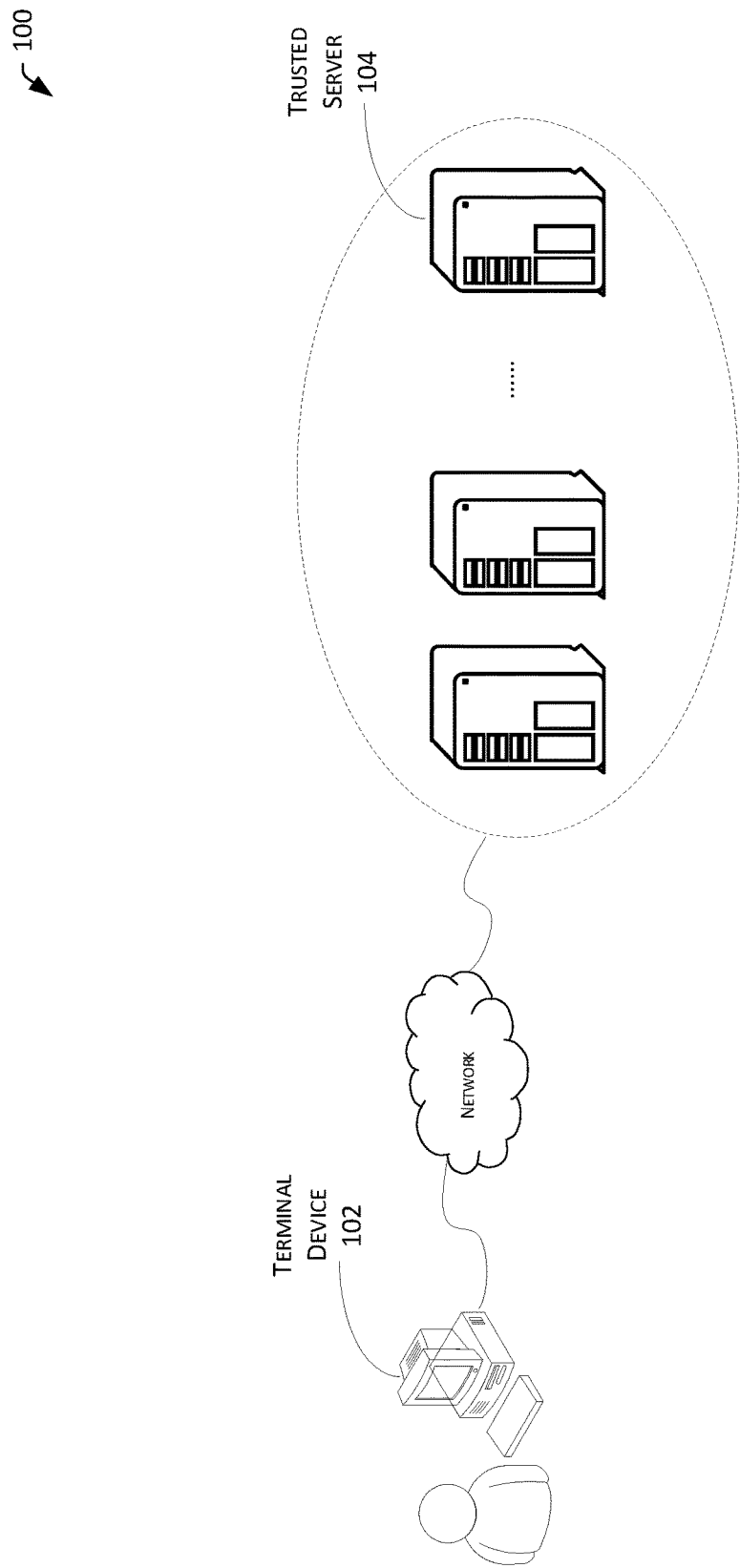
FIG. 1 is a schematic diagram of a policy deployment system of a trusted server in accordance with an embodiment of the present disclosure.

In order to enable one skill in the art to understand solutions of the present disclosure, the technical solutions in the embodiments of the present disclosure are clearly and completely described hereinafter with reference to the accompanying drawings in the embodiments of the present disclosure. Apparently, the described embodiments represent merely a part and not all of the embodiments of the present disclosure. All other embodiments that are obtained by one of ordinary skill in the art based on the embodiments of the present disclosure without making any creative effort shall fall within the scope of protection of the present disclosure.

It should be noted that terms "first", "second" and the like in the specification and claims of the present disclosure and the above-mentioned drawings are used for distinguishing between similar objects, and are not necessarily used for describing a specific order or sequence. It should be understood that data so used may be interchanged wherever appropriate, so that the embodiments of the present disclosure described herein can be implemented in an order other than those illustrated or described herein. In addition, terms "include" and "contain" and any variations thereof are intended to cover a non-exclusive inclusion. For example, a process, method, system, product, or device that includes a series of operations or units is not necessarily limited to these operations or units that are explicitly listed, and may include other operations or units that are not explicitly listed or that are inherent to such process, method, product or device.

First, some nouns or terms that appear in a process of describing the embodiments of the present disclosure are applicable to the following explanations:

Trusted Computing is a trusted computing platform that is supported by hardware security modules and widely used in a computing and communication system to improve the security of the entire system.

A TPM security chip, having a full name of Trusted Platform Module security chip, refers to a security chip that conforms to a TPM (Trusted Platform Module) standard. It can effectively protect a PC and avoid accesses by unauthorized users. TPM is a core component of a trusted computing platform, and is usually a security chip having a cryptographic computing power and a storage capability. A trusted computing platform employs TPM as the core, and by establishing a trusted root, uses integrity metrics and integrity reporting mechanisms to build a trust chain from an underlying trust root to applications in an upper layer in a PC platform, thereby protecting various types of applications and services running on the platform.

A trusted server, starting with a trusted chip, builds servers of a trust chain of a platform from hardware to software and from the bottom to the top for a customer. The trusted server establishes an SSL secure channel between a browser and the servers to achieve confidentiality and integrity of data transmission.

An integrity metric policy refers to a mechanism for performing integrity metrics of a system platform in trusted computing, and is used for configuring metric object(s) and metric algorithm(s) for the integrity metrics of the system platform.

A system integrity metric policy is used for configuring algorithms or procedures related to integrity metrics to the system.

A hardware platform integrity metric policy is used for configuring a related metric algorithm or metric object for performing integrity metrics on hardware.

An integrity verification policy is used for configuring a baseline value for integrity metrics for a system platform.

A system integrity verification policy is used for configuring a baseline value for integrity metrics of an operating system kernel a management profile, and a program file.

A hardware integrity verification policy is used for configuring a baseline value that verifies integrity of a hardware platform.

First Embodiment

According to the embodiments of the present disclosure, an embodiment of a policy deployment system of a trusted server is provided, which is used for deploying, updating, or deleting related policies of trusted computing. It should be noted that the embodiment can be applied to metrics of a trusted server in any network application or service system.

Figure 2:
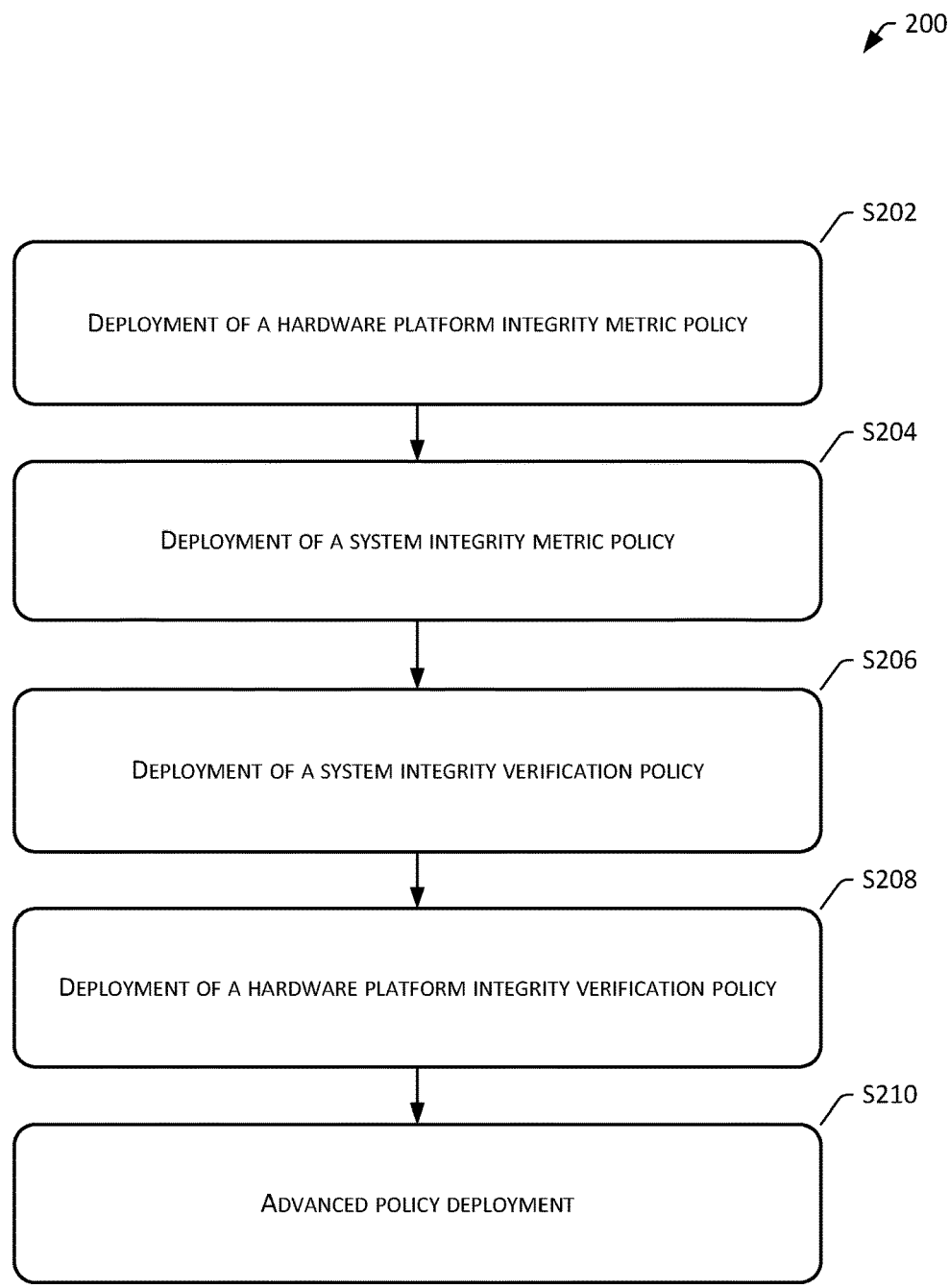
FIG. 2 is a flowchart of a trusted server deployment in accordance with an alternative embodiment of the present disclosure.

In implementations, FIG. 1 is a schematic diagram of a deployment system 100 of a trusted server according to an optional embodiment of the present disclosure. As shown in FIG. 1, the system 100 includes a terminal device 102 and a trusted server 104. A user can deploy related policies of the trusted server 104 using the terminal device 102 by way of a local login or a remote single machine login. FIG. 2 is a flowchart of a trusted server deployment according to an optional embodiment of the present disclosure. As shown in FIG. 2, a deployment process 200 of a metric policy may include the following operations.

Operation S202: Deployment of a hardware platform integrity metric policy, i.e., configuring a metric algorithm and a metric object of a hardware integrity metric.

Operation S204: Deployment of a system integrity metric policy, i.e., deploying a system program object and a metric algorithm after a TPM owner and a SRK are created, the metric algorithm being determined according to a metric algorithm in the metric policy.

Operation S206: Deployment of a system integrity verification policy, i.e., after the system integrity metric policy is deployed, reading PCR10 and PCR1 using a hash algorithm type carried by a user and are used as reference values of the system integrity verification policy, the carried hash algorithm type needed to be consistent with the metric algorithm in the system integrity metric strategy, otherwise they are all zeros.

Operation S208: Deployment of a hardware platform integrity verification policy, i.e., storing a first metric result in a specified PCR0~7 value.

Operation S210: Advanced policy deployment, i.e., in response to detecting that integrity of a hardware or system kernel is destroyed, stopping loading of the kernel, and deciding whether to load the kernel only after a privilege code is inputted correctly.

As can be seen, in the above deployment of trusted server metric policies, strict hierarchical relationships exist for deployment, update, and deletion of the metric policies. Therefore, a dependency exists when a metric policy is updated. For example, a system metric policy update needs to be an update under a condition that an integrity verification policy does not exist, or an error is reported otherwise. A system integrity verification policy update needs to be an update under a condition that a hardware platform integrity verification policy does not exist, or an error is reported otherwise. A hardware platform integrity verification policy update needs to be an update under a condition that an advanced policy does not exist, or an error is reported otherwise. In addition, a corresponding dependency exists when a metric policy is deleted. For example, an advanced policy needs to be deleted so that a hardware platform integrity verification policy can be deleted. A hardware platform integrity verification policy needs to be deleted so that a system integrity verification policy can be deleted. A system integrity verification policy needs to be deleted so that a system integrity metrics policy can be deleted.

In addition, since a metric algorithm and a metric object of a metric policy determine a metric algorithm and a metric object of a verification policy, deployment, update, and deletion of a trust-related policy have strict hierarchical relationships, which are not independent and flexible. Moreover, if a verification algorithm of the verification policy is inconsistent with the metric algorithm of the metric policy, this will lead to an error in a verification result.

Second Embodiment

According to the embodiments of the present disclosure, a system embodiment for detecting a trusted server is further provided to overcome the problems of non-independence and inflexibility due to strict hierarchical relationships between deployment, update, and deletion of a trusted related policy in the first embodiment. It should be noted that the embodiment can be applied to metrics of a trusted server in any network application or service system.

The inventors found that a trusted platform policy management platform based on a cloud platform can be provided in order to achieve centralized management of trusted servers, and functions thereof include, but are not limited to, initial deployment, intelligent control, and operation and maintenance of trusted servers in a variety of service environments, which can not only simplify an environment configuration of trusted software and hardware of a trusted server of a service party (including metric policies, verification policies, advanced policies, etc. of the trusted software and hardware), but also simplify a process of network access of the service trusted server and an initialization process of the trusted server of the service party on a trusted server policy management platform, thus enabling the service party to pay more attention to its own applications and saving time and effort.

Figure 3:
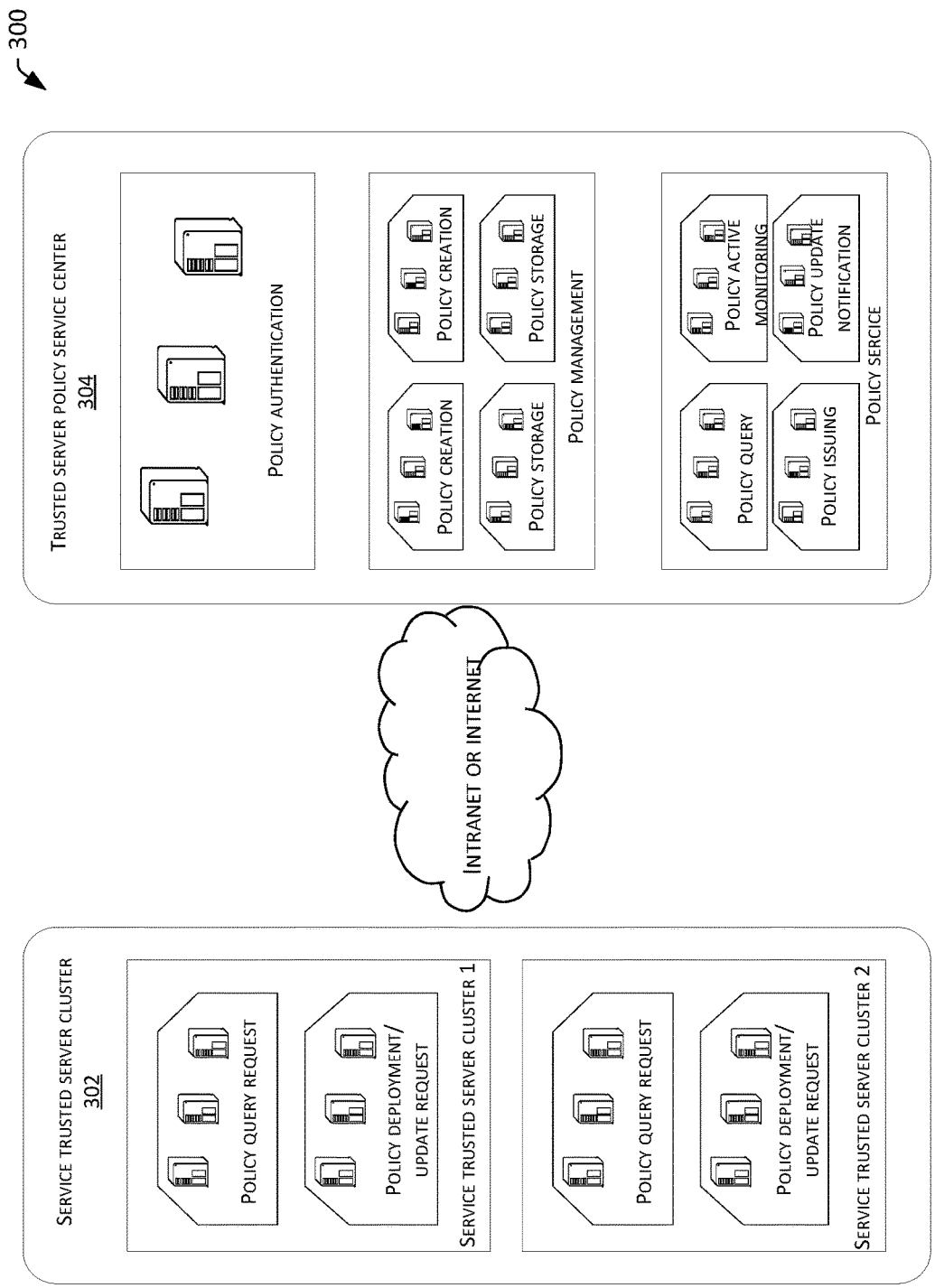
FIG. 3 is a schematic diagram of a centralized policy deployment architecture of a trusted server in accordance with an alternative embodiment of the present disclosure.

In implementations, FIG. 3 is a schematic diagram of centralized policy deployment architecture 300 of a trusted server according to an optional embodiment of the present disclosure. As shown in FIG. 3, from the perspective of roles of entities, the centralized policy deployment architecture of the trusted server is implemented is made up of two parts, a service trusted server cluster 302 and a trusted server policy service center 304.

The service trusted server cluster 302 may initiate a service request for policy query, policy deployment or policy update to the trusted server policy service center.

The trusted server policy server center 304 is mainly composed of three parts, a policy authentication service, a policy management service, and a policy service. The policy authentication service has a function of legally authenticating a service request for a service trusted server policy. The policy management service has functions of performing security creation, update, storage, and deletion, etc., for a trusted server policy. Other than responding to policy query, policy deployment and policy update requests of a service trusted server, the policy service further has the following functions: functions of actively detecting changes in a system kernel, application software and a hardware platform, and policy changes of the trusted server, and being capable of actively reminding the service trusted server cluster whether to update a policy and to start a system when a change in software and hardware occurs; actively detecting whether a hardware and software metric algorithm of a certain object and a verification algorithm are consistent, and automatically reminding the service trusted server to maintain consistency when policy deployment is completed, if a metric algorithm of a certain object and a metric algorithm of a verification policy are inconsistent.

Figure 4:
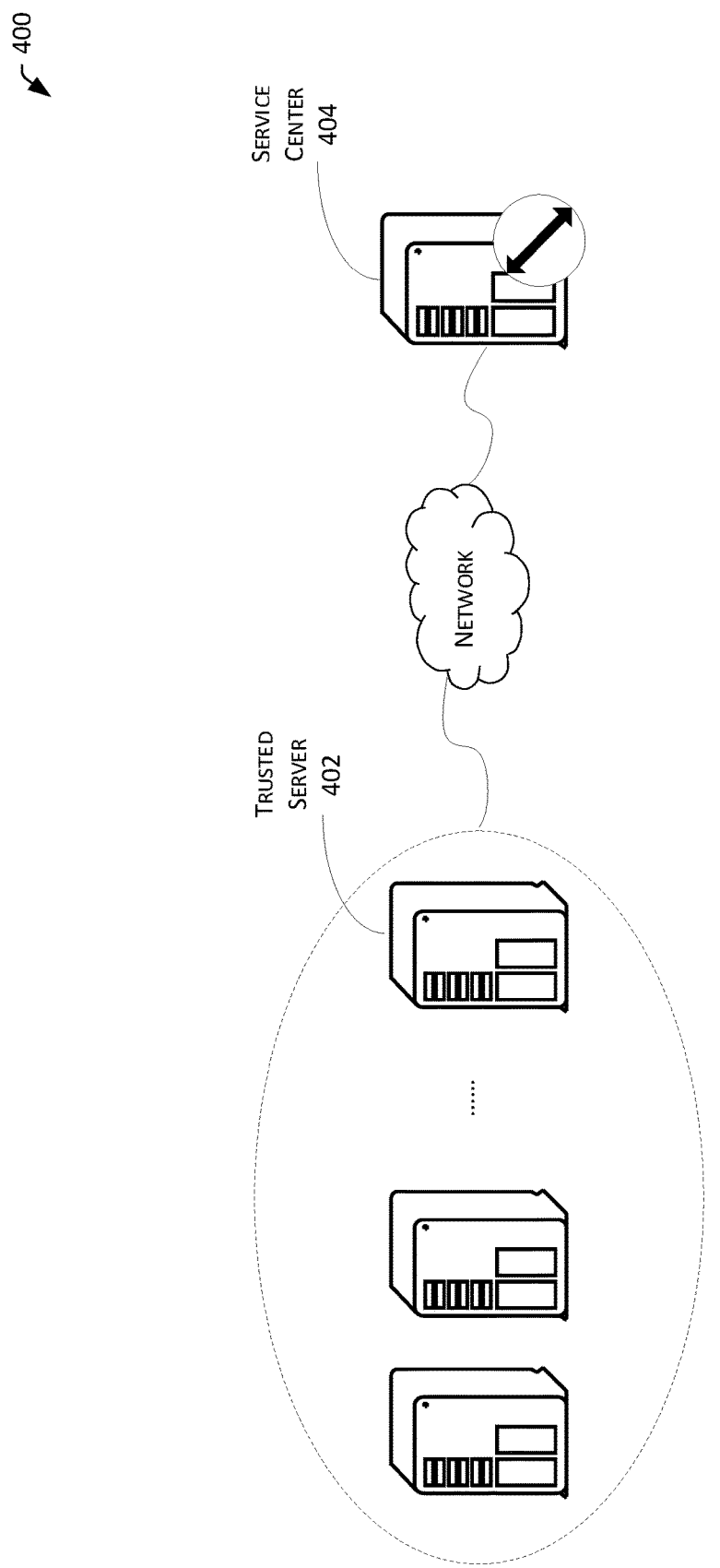
FIG. 4 is a schematic diagram of a policy deployment system of a trusted server in accordance with an embodiment of the present disclosure.

Based on the centralized policy deployment architecture 300 of the trusted server as shown in FIG. 3, in implementations, FIG. 4 is a schematic diagram of a policy deployment system 400 of a trusted server according to an embodiment of the present disclosure. As shown in FIG. 4, the system 400 includes a trusted server 402 and a service center 404.

The trusted server 402 is configured to send a metric policy of at least one metric object and a verification policy of at least one verification object.

The service center 404 communicates with the trusted server, and is configured to send reminder information to the trusted server if detecting that a metric algorithm of a metric object is inconsistent with a verification algorithm of a corresponding check object, wherein the reminder information is used for reminding the trusted server to redeploy a metric algorithm and a verification algorithm that are consistent.

It should be noted that the foregoing trusted server 402 may send a service request to the service center 404. A type of the service request includes at least one of the following: a policy query request, a policy deployment request, and a policy update request. When the service request is a policy deployment request, the trusted server obtains a policy that needs to be deployed through an access to the service center. Optionally, the service center 404 can verify the security of a transmission channel between the trusted server and the service center according to the service request that is received.

Optionally, in implementations, when the service center 404 is connected to at least one trusted server 402, each trusted server 402 may send a policy deployment request to the service center, and receive a policy that needs to be deployed from the service center 404 when determining that a transmission channel with the service center 404 is secure.

As an optional implementation, different metric policies and verification policies can be deployed for different metric objects. This enables a service party to flexibly and independently deploy different metric policies and verification policies for different metric objects according to service requirements.

In implementations, the trusted server 402 is an arbitrary trusted server of the service trusted server cluster. The service center 404 may be a platform used for performing centralized management of metric policies of the trusted server 402. A process of interactions between the trusted server 402 and the service center 404 is shown in FIG. 5.

Figure 5:
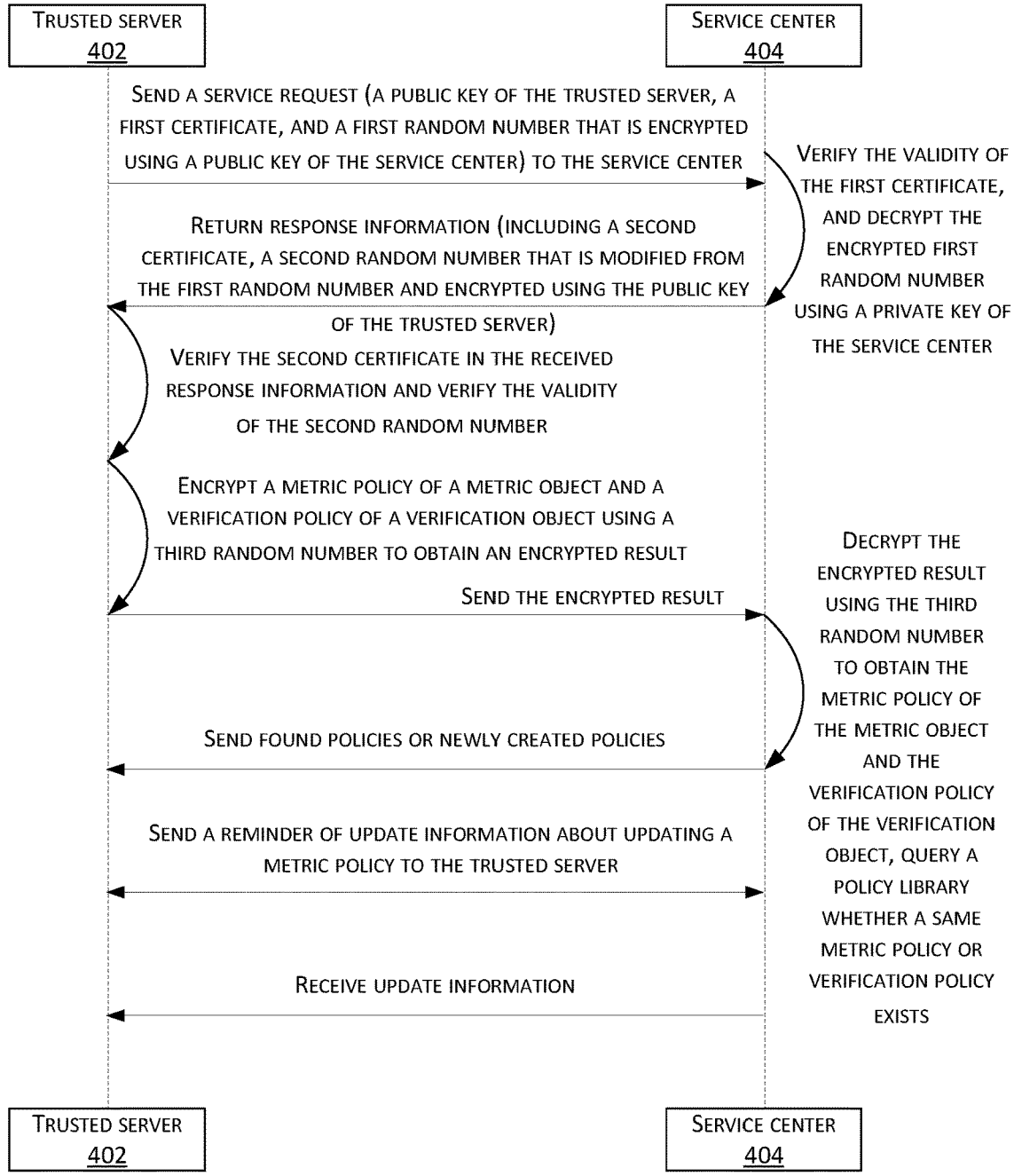
FIG. 5 is a schematic diagram of interactions of centralized policy management of a trusted server in accordance with an alternative embodiment of the present disclosure.

FIG. 5 is a schematic diagram of interactions 500 associated with centralized policy management of a trusted server according to an optional embodiment of the present disclosure. As shown in FIG. 5, the trusted server 402 can send a service request (which includes, but is not limited to, a policy query request, a policy deployment request, and a policy update request) to the service center. The service center 404 can verify the validity of the trusted server based on the received service request, and return response information corresponding to the service request. In an event that the service request is a policy deployment request, the service center 404 returns a policy that needs to be deployed to the trusted server 402. The trusted server 402 can perform validity verification on the service center 404 based on the response information returned by the service center 404. In response to verifying that a transmission channel between the trusted server 402 and the service center 404 is secure, the trusted server 402 receives the policy that needs to be deployed. During a deployment of the policy, the trusted server 402 transmits a metric policy of at least one metric object and a verification policy of at least one verification object to the service center 404. After receiving the metric policy of the metric object and the verification policy of the verification object from the trusted server 402, the service center 404 determines whether a metric algorithm corresponding to the metric object is consistent with a verification algorithm of the verification object, and sends reminder information that is used for reminding the trusted server to redeploy a metric algorithm and a verification algorithm that are consistent when the metric algorithm of the metric object is inconsistent with the verification algorithm of the corresponding verification object.

In order to establish a secure channel for data transmission between the trusted server 402 and the service center 404, as an optional implementation, the service request sent by the trusted server 402 to the service center 404 includes a public key of the trusted server, a first certificate, and a first random number that is encrypted using a public key of the service center. Therefore, after the service center 404 receives the service request from the trusted server 402, the service center 404 needs to verify the validity of the first certificate included in the service request. When the first certificate is verified to be valid, the service center 404 decrypts the encrypted first random number in the service request using a private key thereof, and obtains the first random number before encryption.

After receiving the service request from the trusted server 402, the service center 20 needs to return response information to the trusted server 402, the response information including a second certificate of the service center 404 and a second random number that is encrypted by the service center 404 using the public key of the trusted server 402. The second random number is a random number that is a variant of the first random number.

After the trusted server 402 receives the response information returned by the service center 404, the trusted server 402 verifies the second certificate in the received response information, verifies the validity of the second random number, and determines that the transmission channel between the trusted server 402 and the service center 404 is secure when verification of the second certificate is successful and/or the second random number is verified to be legitimate.

Under the circumstance that the transmission channel between the trusted server 402 and the service center 404 is secure, the trusted server 402 encrypts a metric policy of at least one metric object and a verification policy of at least one verification object using a third random number to obtain an encrypted result, and transmits the encrypted result to the service center 404. The third random number is a result of a variant of the second random number that is included in the response information received by the trusted server 402 from the service center 404.

After the trusted server 402 transmits the encrypted result that is obtained by encrypting the metric policy of the at least one metric object and the verification policy of the at least one verification object using the third random number to the service center 404, the service center 404 receives the encrypted result from the trusted server 402, obtains the third random number, and decrypts the encrypted result using the third random number to obtain the metric policy of the at least one metric object and the verification strategy of the at least one verification object that come from the trusted server 402. The service center 404 performs an inquiry in a policy library whether policies that are the same as a metric policy of any one or more metric objects and a verification policy of any one or more verification objects obtained from the above decryption exist. If the inquiry in the policy library is successful, the service center 404 delivers found policies to the trusted server 402. If the inquiry fails, the service center 404 creates new policies and delivers the new policies to the trusted server 402.

In implementations, when the service center 404 finds policies that are the same as a metric policy of any one or more metric objects and a verification policy of any one or more verification objects obtained from the above decryption in the policy library, the service center 404 encrypts the found policies or the new policies using a variant random number, and transmits an encrypted result to the trusted server 402.

In implementations, after the service center 404 encrypts the found policies or the new policies using the variant random number, and sends the encrypted result to the trusted server 402, the trusted server 402 may also decrypt an encrypted policy configuration file using the variant random number and deploy the decrypted policy configuration file on the trusted server.

According to any embodiments described above, it should be noted that the foregoing service center that is used for centralized management of trusted server policies can actively detect changes in a system kernel, an application software and a hardware platform, and policy change functions of each trusted server in the service trusted server cluster. The service center can actively remind the service trusted server cluster whether to update a policy and to start a system when the software and hardware are changed. The service center actively detects whether a hardware and software metric algorithm of a certain object and a verification algorithm are consistent, and automatically reminds the service trusted server to maintain consistency when policy deployment is completed, if a metric algorithm of a certain object and a metric algorithm of a verification policy are inconsistent. This makes deployment, update, and deletion of trusted related policies no longer to have strict hierarchical relationships. A service party can be dissociated from the management of trusted server policies and the cumbersome deployment of the trusted related policies to better focus on their own applications, thus saving time and effort. Therefore, as an optional implementation, the service center 404 can actively send update information to the trusted server 402, and the trusted server 402 receives the update information returned by the service center 404. The update information is used for representing a reminder to the trusted server 402 whether a metric policy needs to be updated in case of a change in software and hardware occurs.

Third Embodiment

According to the embodiments of the present disclosure, an embodiment of a policy deployment method of a trusted server is further provided. The present embodiment may be applied to a trusted server in the policy deployment system of the trusted server in the second embodiment, and includes, but is not limited to scenarios in the second embodiment. It should be noted that the procedure shown in a flowchart of an accompanying drawing may be executed in a computer system such as a set of computer executable instructions. Moreover, although a logical order is shown in the flowchart, in some cases, a procedure may be performed in an order that is different from the one shown or described herein.

Currently, in existing solutions of trusted server policy deployment, a metric algorithm of a verification policy and a metric object are determined by a metric algorithm and a metric object of a metric policy, and an inconsistency between the metric algorithm of the verification policy and the metric algorithm of the metric policy will lead to an error in a verification result. In addition, since a single metric algorithm is adopted for all metric objects, service parties of different service trusted servers are not allowed to flexibly deploy different metric policies and verification policies for different metric objects according to service requirements. Furthermore, due to an existence of strict hierarchical relationships among deployment, update and deletion of trust-related policies, independence is relatively poor.

Figure 6:
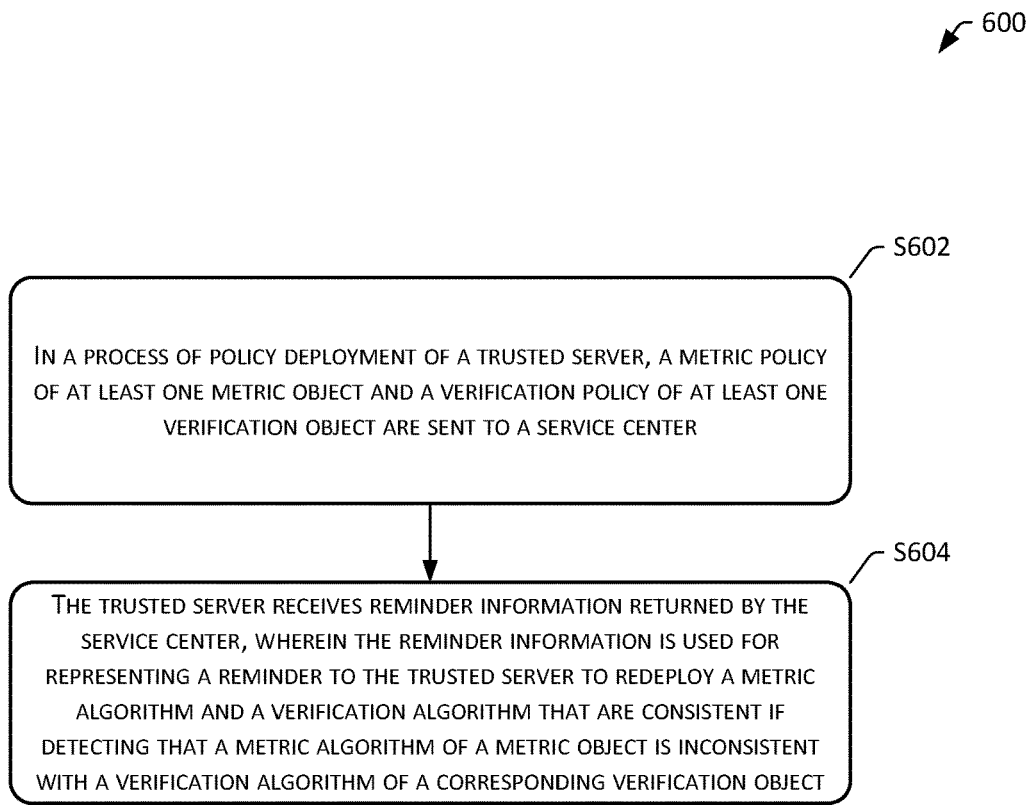
FIG. 6 is a flowchart of a policy deployment method of a trusted server in accordance with an embodiment of the present disclosure.

In order to solve the above problems, the present disclosure provides a method for a policy deployment of a trusted server. FIG. 6 is a flowchart of a method 600 for a policy deployment of a trusted server according to an embodiment of the present disclosure, which includes the following operations as shown in FIG. 6.

Operation S602: In a process of policy deployment of a trusted server, a metric policy of at least one metric object and a verification policy of at least one verification object are sent to a service center.

In implementations, the service center can be a cloud platform that centrally manages metric policies of a trusted server cluster (including at least one service trusted server used for providing different services). The trusted server can be any one trusted server in the trusted server cluster. The metric object can be a software object on the trusted server (for example, various types of system programs or software application programs), or a hardware object on the trusted server, (e.g., a kernel, a hard disk, etc.). Furthermore, as an alternative embodiment, different metric algorithms are deployed for different metric objects on trusted servers of different services.

It should be noted that deploying different metric algorithms for different metric objects can allow a service party of a service trusted server to flexibly and independently deploy different metric policies and verification policies for different metric objects according to service requirements.

In addition, it should also be noted that a centralized management of trusted server policies through a service center that is based on cloud platform technologies can achieve automatic configuration of metric policies, verification policies, advanced policies, and the like of trusted software and hardware on a plurality of trusted servers, simplify a network access process of the trusted servers, simplify an initialization process of the trusted servers on an intelligent management platform, thus enabling a service party to pay more attention to applications thereof in order to save time and effort.

Operation S604: The trusted server receives reminder information returned by the service center, wherein the reminder information is used for representing a reminder to the trusted server to redeploy a metric algorithm and a verification algorithm that are consistent if detecting that a metric algorithm of a metric object is inconsistent with a verification algorithm of a corresponding verification object.

In implementations, the reminder information is used for notifying the trusted server to redeploy a metric algorithm of a metric object and a verification algorithm of a corresponding verification object that are inconsistent when the service center detects that the metric algorithm of the metric object on the trusted server is inconsistent with the verification algorithm of the corresponding verification object.

It should be noted that, an error easily occurs during verification when a metric algorithm of a metric object on the trusted server is inconsistent with a verification algorithm of a corresponding verification object. Therefore, if detecting a metric algorithm of a metric object is inconsistent with a verification algorithm of a corresponding verification object, and the service center reminds the trusted server to redeploy a metric algorithm and a verification algorithm to maintain consistency.

As can be seen from the above, in the foregoing embodiments of the present disclosure, using a manner of centralized deployment and management of trusted server policies, any one or more trusted servers in a trusted server cluster that deploy and manage policies through a service center that is based on cloud platform technologies can send a metric policy and a verification policy of one or more trusted software and hardware metric objects to the service center. When detecting that a metric algorithm of a trusted software and hardware metric object and a verification algorithm of a corresponding verification object that inconsistent, the service center reminds the trusted server to re-deploy a metric algorithm and a verification algorithm to maintain consistency.

It is easy to note that different metric algorithms are deployed for different metric objects on trusted servers of different services, so that the trusted servers of different services can flexibly and independently deploy metric policies and verification policies according to service requirements.

Through the solutions disclosed in the foregoing embodiments, the purpose of centralized management of automatic configuration of metric policies and verification policies of trusted software and hardware on multiple trusted servers is achieved, thus realizing technical effects of saving time and effort of service party of each service trusted server, and thereby solving the technical problems of poor independence and flexibility due to an employment of a same metric algorithm for all metric objects by existing trusted server policy management solutions.

Figure 7:
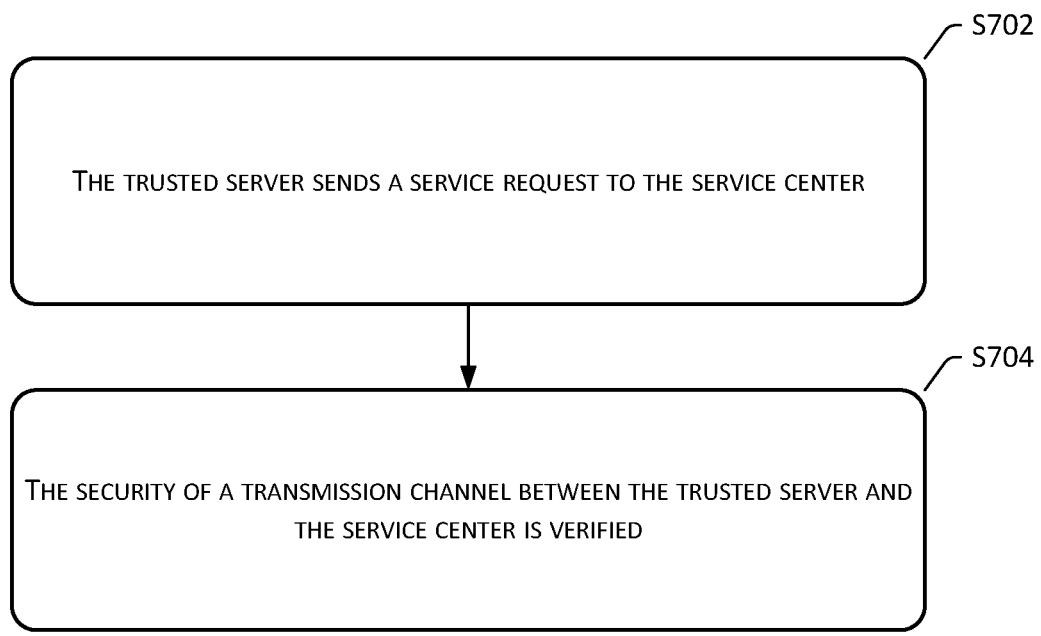
FIG. 7 is a flowchart of a policy deployment method of a trusted server in accordance with an alternative embodiment of the present disclosure.

In implementations, as shown in FIG. 7, before sending the metric policy of the at least one metric object and the verification policy of the at least one verification object to the service center, the foregoing method 600 may further include the following operations.

Operation S702: The trusted server sends a service request to the service center, wherein a type of the service request includes at least one of the following: a policy query request, a policy deployment request, and a policy update request. When the service request is the policy deployment request, the trusted server obtains a policy that needs to be deployed by accessing the service center.

Optionally, as shown in FIG. 7, after the trusted server sends the service request to the service center at operation S702, the method may further include:

Operation S704: The security of a transmission channel between the trusted server and the service center is verified, wherein the operation of sending the metric policy of the at least one metric object and the verification policy of the at least one verification object by the trusted server to the service center is performed when the transmission channel is secure.

Specifically, in the foregoing embodiment, the service center may provide services such as querying, deploying, or updating a metric policy or a verification policy to any one trusted server of the trusted server cluster. Before the service center performs automatic configuration of policies of any trusted server of the trusted server cluster, any trusted server in the trusted server cluster can send a service request to the service center, and the service request that is sent includes, but is not limited to, a policy query request, a policy deployment request, and a policy update request. In order to ensure the security of a transmission channel for data communication between the trusted server and the service center, the security of the transmission channel between the trusted server and the service center needs to be verified. In case of verifying that the transmission channel is secure, the trusted server sends a metric policy of a metric object and a verification policy of a verification object to the service center, so that the service center verifies whether a metric algorithm of the metric object on the trusted server is consistent with a verification algorithm of the corresponding verification object.

Through the foregoing embodiments, the security of a transmission channel between any trusted server in the trusted server cluster and the service center that centrally manages the trusted server cluster is improved, thereby ensuring the security of the centralized management of the policies of the trusted servers.

Figure 8:
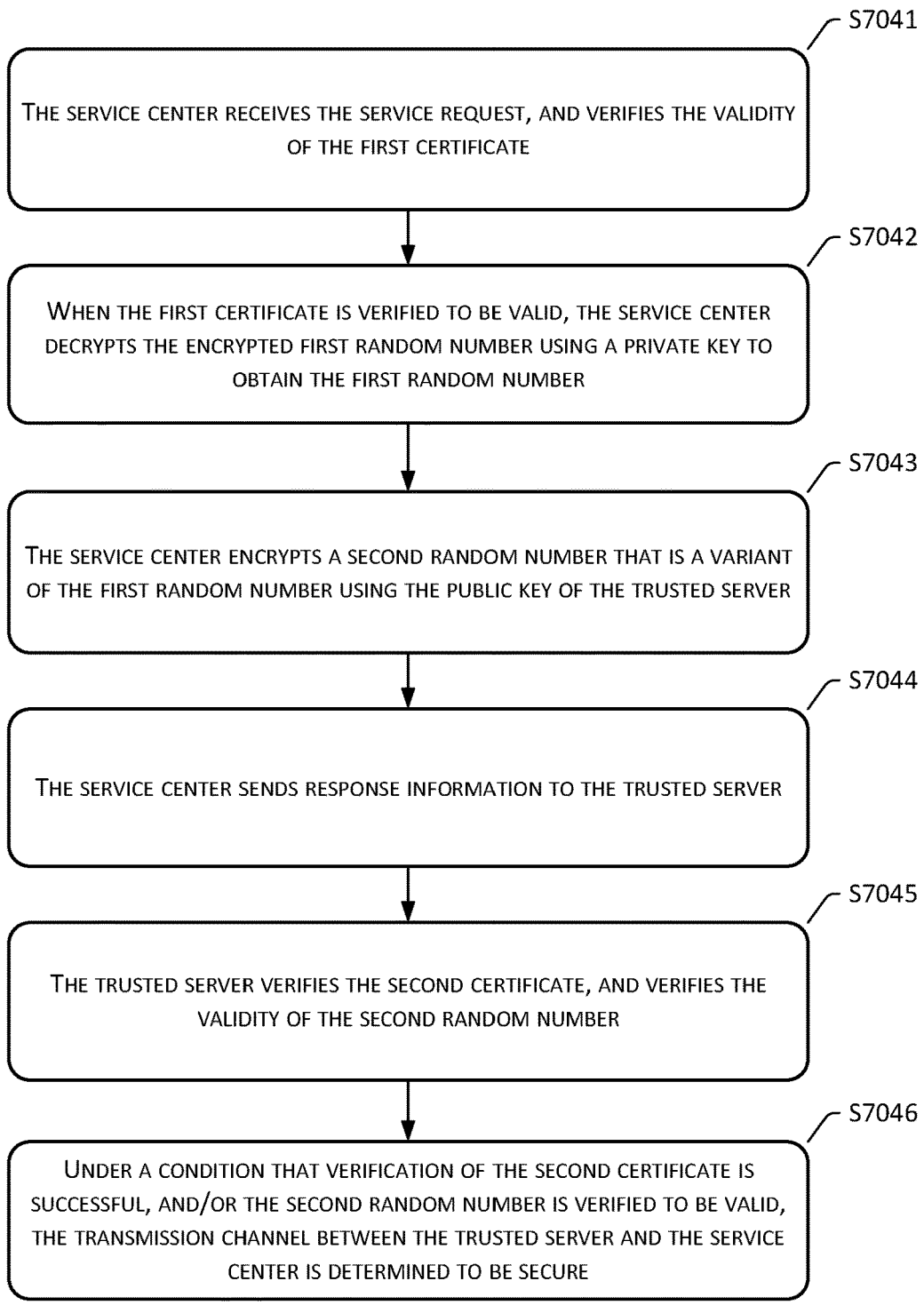
FIG. 8 is a flowchart of a policy deployment method of a trusted server in accordance with an alternative embodiment of the present disclosure.

Based on the foregoing embodiment, it should be noted that the service request includes at least a public key of the trusted server, a first certificate, and a first random number encrypted using a public key of the service center as an optional implementation. As shown in FIG. 8, verifying the security of the transmission channel between the trusted server and the service center at operation 704 may include the following operations.

Operation S7041: The service center receives the service request, and verifies the validity of the first certificate.

Operation S7042: When the first certificate is verified to be valid, the service center decrypts the encrypted first random number using a private key to obtain the first random number.

Specifically, in the foregoing embodiment, in order to verify the security of the transmission channel between the trusted server and the service center, the service request sent by any trusted server of the trusted server cluster further includes a public key of the trusted server, a first certificate, and a first random number encrypted using a public key of the service center. After receiving the service request from the trusted server, the service center verifies the validity of the first certificate included in the service request. Upon verifying that the first certificate is valid, the service center decrypts the encrypted first random number using its own private key (the private key and the public key used to encrypt the first random number in the service request are a pair of keys) to obtain the first random number that is prior to encryption.

Optionally, based on the foregoing embodiment, in an optional implementation, as shown in FIG. 8, after the first random number is obtained by decrypting the encrypted first random number using the private key in the service center, the foregoing method may also include the following operations.

Operation S7043: The service center encrypts a second random number that is a variant of the first random number using the public key of the trusted server.

Operation S7044: The service center sends response information to the trusted server, wherein the response information includes at least the second random number and a second certificate of the service center.

Specifically, in the foregoing embodiment, after verifying that the first certificate is valid, and uses its own private key (the private key and the public key used to encrypt the first random number in the service request are a pair of keys) to decrypt the encrypted first random number to obtain the first random number that is prior to encryption, the service center encrypts the second random number that is a variant of the first random number using its own public key, and adds the second random number into response information that is returned by the service center to the trusted server, which is returned to the trusted server.

It should be noted that the second random number refers to a random number obtained by modifying the first random number using a random number variant algorithm.

The random number variant algorithm used for modifying a random number needs to be pre-negotiated by both parties. For example, the first random number is represented by x, and x may be any constant that is generated randomly. The second random number is represented by y. If the negotiated random number algorithm is to add 3 into the first random number, the second random number is y=x+3=5 when the first random number is x=2. As can be seen, y can be taken as different values using different random number variant algorithms. By modifying a random number, attacks from intermediate third parties can be prevented. If s is intercepted by an intermediate third party, 2 that is obtained by an attacker is useless because the value that actually works is 5.

Further, based on the foregoing embodiment, as an optional implementation, as shown in FIG. 8, after the service center sends the response information to the trusted server, the foregoing method may further include the following operations.

Operation S7045: The trusted server verifies the second certificate, and verifies the validity of the second random number.

Operation S7046: Under a condition that verification of the second certificate is successful, and/or the second random number is verified to be valid, the transmission channel between the trusted server and the service center is determined to be secure.

Specifically, in the foregoing embodiment, after the service center returns the response information including the second certificate of the service center and the second random number encrypted by the service center using the public key of the trusted server to the trusted server, the trusted server verifies the second certificate of the service center in the received response information, verifies the validity of the second random number, and determines that the transmission channel between the trusted server and the service center is secure when verification of the second certificate is successful, and/or the second random number is verified to be valid.

Through the above embodiments, the security of the transmission channel between the trusted server and the service center is ensured by dual verification of the digital certificate and the random number.

Figure 9:
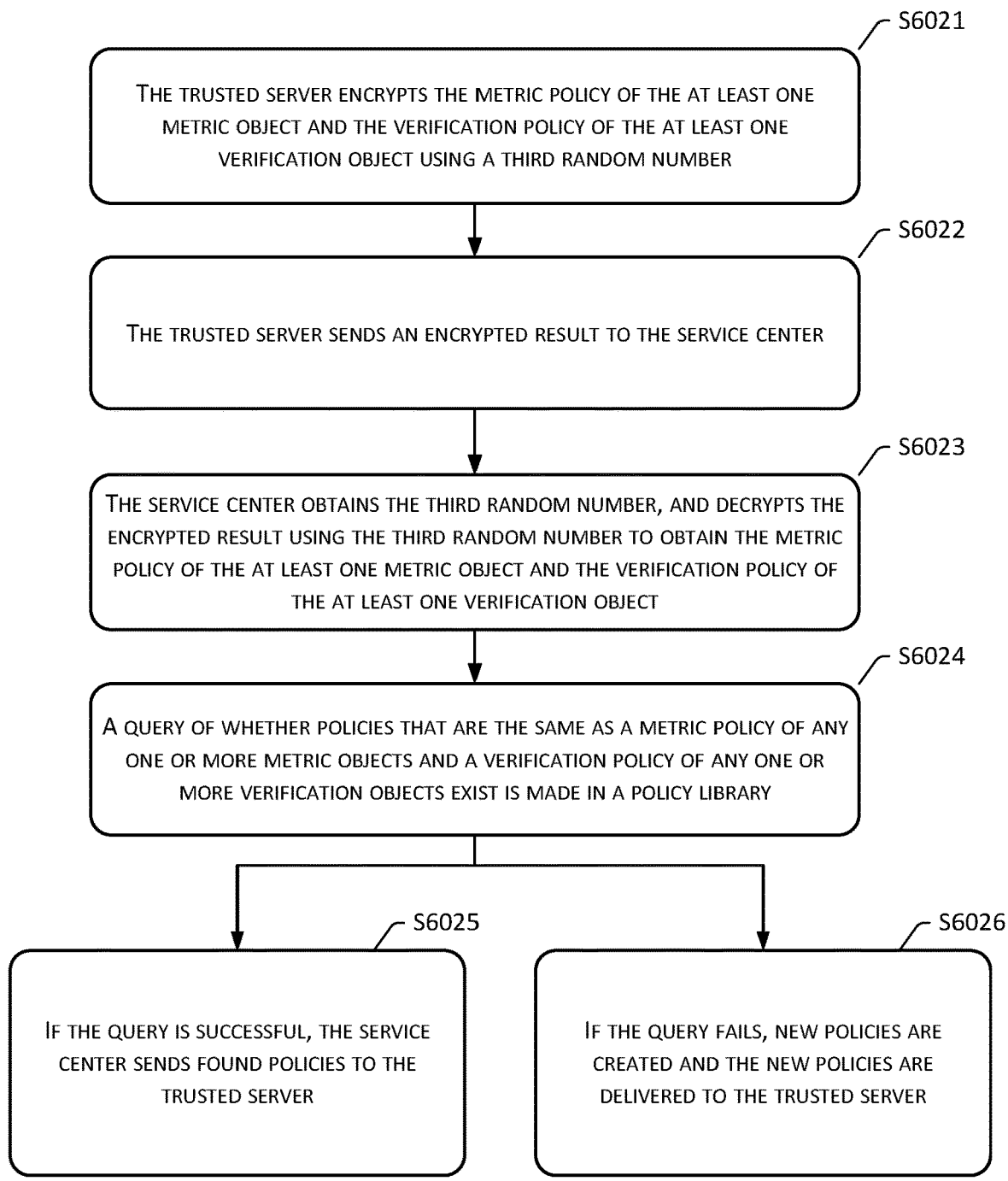
FIG. 9 is a flowchart of a policy deployment method of a trusted server in accordance with an alternative embodiment of the present disclosure.

It should be noted that, when the transmission channel is secure, as an optional implementation, sending the metric policy of the at least one metric object and the verification policy of the at least one verification object to the service center during the deployment process of the trusted server may include the following operations as shown in FIG. 9.

Operation S6021: The trusted server encrypts the metric policy of the at least one metric object and the verification policy of the at least one verification object using a third random number, wherein the third random number is a result of modification of the second random number.

Operation S6022: The trusted server sends an encrypted result to the service center.

Specifically, in the foregoing embodiment, upon determining that the transmission channel between the trusted server and the service center is secure, in order to further improve data security, the trusted server encrypts the metric policy of the metric object and the verification policy of the verification object to obtain an encrypted result using a third random number that is modified by a random number variant algorithm, and sends the encrypted result to the service center.

Through the foregoing embodiment, the security of the metric policy and the verification policy sent by the trusted server to the service center can be improved.

Optionally, as shown in FIG. 9, after the trusted server sends the encrypted result to the service center, the foregoing method may further include the following operations.

Operation S6023: The service center obtains the third random number, and decrypts the encrypted result using the third random number to obtain the metric policy of the at least one metric object and the verification policy of the at least one verification object.

Operation S6024: A query of whether policies that are the same as a metric policy of any one or more metric objects and a verification policy of any one or more verification objects exist is made in a policy library.

Operation S6025: If the query is successful, the service center sends found policies to the trusted server.

Operation S6026: If the query fails, new policies are created and the new policies are delivered to the trusted server.

Specifically, in the foregoing embodiment, after the trusted server sends the metric policy and the verification policy encrypted by the third random number to the service center, the service center receives the encrypted metric policy and the encrypted verification policy, decrypts the encrypted metric policy and the encrypted verification policy using the third random number to obtain the metric policy and the verification policy that are come from the trusted server, and queries whether policies that are the same as a metric policy of any one or more metric objects and a verification policy of one or more verification objects exist in a policy library. If the same policies are found, the found policies are sent to the trusted server. If the same policies are not found, new policies are created, and the created new policies are delivered to the trusted server.

As a first optional implementation, after the service center obtains same policies from the query or creates new policies, the method further includes using a modified random number to encrypt the found policies or the new policies, and sending an encrypted result to the trusted server.

As a second optional implementation, after the service center obtains same policies from the query or creates new policies, the method further includes: using a modified random number to encrypt the found policies or the new policies to obtain an encrypted policy configuration file, and sending the encrypted policy configuration file to the trusted server.

Optionally, in the foregoing second implementation, the method further includes decrypting the encrypted policy configuration file using the modified random number, and deploying the decrypted policy configuration file on the trusted server.

Based on any of the foregoing optional implementations, the method may further include the trusted server further receiving update information returned by the service center, wherein the update information is used for representing a reminder to the trusted server as to whether a metric policy needs to be updated when a change in hardware and software of the trusted server occurs.

Figure 10:
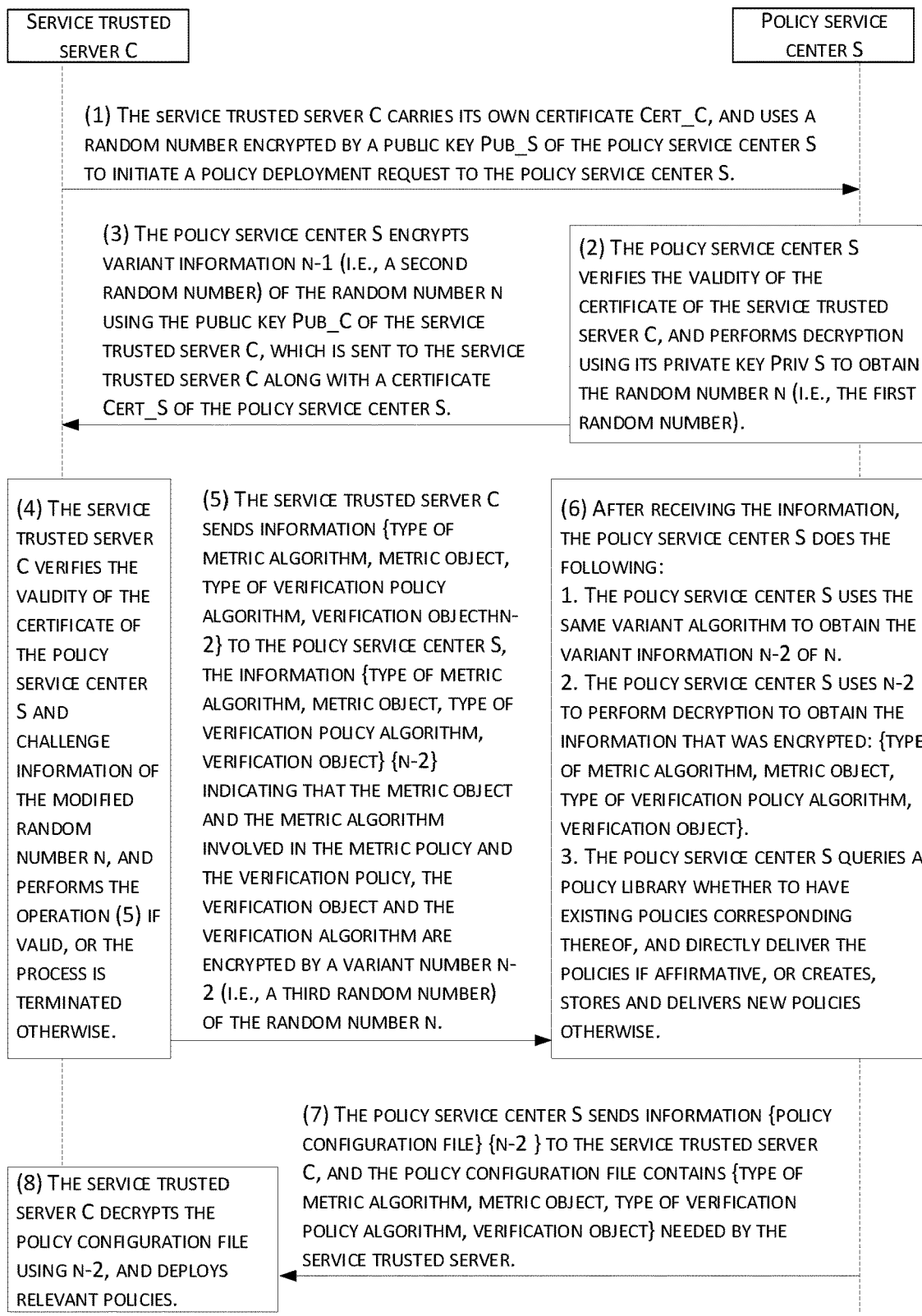
FIG. 10 is a flowchart of a centralized policy deployment of a trusted server in accordance with an alternative embodiment of the present disclosure.

It should be noted that the trusted server in the foregoing service trusted server cluster may initiate any one of the following service requests to the trusted server policy service center: a policy query request, a policy deployment request, or a policy update request. Considering the similarities of these three processes and the differences being content of requested services, a policy deployment request is used as an example for describing a related service process of a service trusted server to obtain a policy from a trusted server policy service center. As an optional implementation, FIG. 10 is a flowchart of a centralized policy deployment 1000 of a trusted server according to an optional embodiment of the present disclosure. As shown in FIG. 10, if a service trusted server C and a trusted server policy service center S possess authentication certificates and related keys, HTTPS or SSL is used for interactions between these two parties to ensure the security of a transmission channel. In addition, if the service trusted server C and the trusted server policy service center S have negotiated a random number variant algorithm, a policy deployment process between the service trusted server C and the trusted server policy service center S includes the following operations.

(1) The service trusted server C carries its own certificate Cert_C, and uses a random number encrypted by a public key Pub_S of the policy service center S to initiate a policy deployment request to the policy service center S.

(2) The policy service center S verifies the validity of the certificate of the service trusted server C, and performs decryption using its private key Priv_S to obtain the random number n (i.e., the first random number).

(3) The policy service center S encrypts variant information n−1 (i.e., a second random number) of the random number n using the public key Pub_C of the service trusted server C, which is sent to the service trusted server C along with a certificate Cert_S of the policy service center S.

(4) The service trusted server C verifies the validity of the certificate of the policy service center S and challenge information of the modified random number n, and performs the operation (5) if valid, or the process is terminated otherwise.

(5) The service trusted server C sends information {type of metric algorithm, metric object, type of verification policy algorithm, verification object}$_{\{n-2\}}$ to the policy service center S, the information {type of metric algorithm, metric object, type of verification policy algorithm, verification object}$_{\{n-2\}}$ indicating that the metric object and the metric algorithm involved in the metric policy and the verification policy, the verification object and the verification algorithm are encrypted by a variant number n−2 (i.e., a third random number) of the random number n.

It should be noted that n−1 and n−2 mentioned in the above operations (4) and (5) are an example of variants of the random number n, which can be obtained completely from modification using a functional algorithm that has been agreed by the service trusted server C and the policy service center S before interactions to ensure the security of non-resettable protocol interactions.

(6) After receiving the information, the policy service center S does the following:

① The policy service center S uses the same variant algorithm to obtain the variant information n−2 of n.

② The policy service center S uses n−2 to perform decryption to obtain the information that was encrypted: {type of metric algorithm, metric object, type of verification policy algorithm, verification object}.

It should be noted that multiple metric objects may adopt different types of metric algorithms, which may be expressed as follows: metric algorithm type 1, metric object 1; metric algorithm type 2, metric object 2; metric algorithm type n, metric object n; verification algorithm type 1, verification object 1; verification algorithm type 2, verification object 2; . . . verification algorithm type n, verification object n).

③ The policy service center S queries a policy library whether to have existing policies corresponding thereof, and directly deliver the policies if affirmative, or creates, stores and delivers new policies otherwise.

(7) The policy service center S sends information {policy configuration file}$_{\{n-2\}}$ to the service trusted server C, and the policy configuration file contains {type of metric algorithm, metric object, type of verification policy algorithm, verification object} needed by the service trusted server.

(8) The service trusted server C decrypts the policy configuration file using n−2, and deploys relevant policies.

It should be noted that, in the solutions of policy deployment of a trusted server provided by the embodiments of the present disclosure, different metric algorithms are used for different metric objects, so that a service party can flexibly and independently deploy different metric policies and verification policies for different metric objects according to service requirements. Since a metric algorithm and a metric object of a metric policy do not depend on a metric algorithm and a metric object of a verification policy, no strict hierarchical relationships among deployment, update and deletion of a trust-related policy exist, Specifically, during a policy update process of a trusted server, an update of a system metric policy does not depend on a system integrity verification policy. An update of a system integrity check policy does not depend on a hardware platform integrity update. A hardware platform integrity update does not depend on an update of an advanced policy. In a process of deleting a trusted server policy, a deletion of a hardware platform integrity verification policy does not depend on whether an advanced policy is deleted. A deletion of a system integrity verification policy does not depend on a deletion of a hardware platform integrity verification policy. A deletion of a system integrity metric policy does not depend on a deletion of a system integrity verification policy. Using the solutions of centralized deployment and management of trusted server policies provided by the embodiments of the present disclosure, a service party is able to be dissociated from the management of the trusted server policies and the cumbersome deployment of the trust-related policies, and to better pay attention to its own applications to save time and effort.

Fourth Embodiment

An embodiment of a policy deployment method of a trusted server is provided according to the embodiments of the present disclosure. The present embodiment may be applied to the service center in the policy deployment system of the trusted server in the second embodiment, which includes, but is not limited to the scenarios in the second embodiment. It should be noted that operations shown in a flowchart of an accompanying drawing may be executed in a computer system such as a set of computer executable instructions. Although a logical order is shown in the flowchart, in some cases, the operations may be performed in an order different from that shown or described herein.

Figure 11:
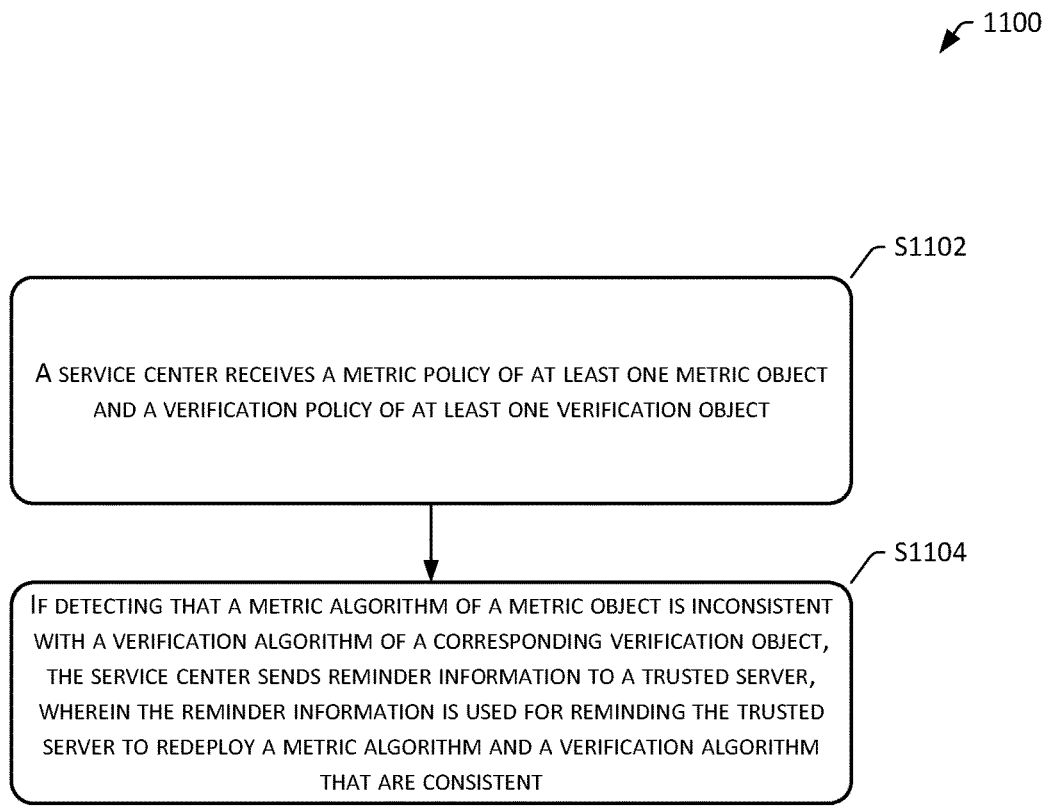
FIG. 11 is a flowchart of a policy deployment method of a trusted server in accordance with an embodiment of the present disclosure.

FIG. 11 is a flowchart of a policy deployment method 1100 of a trusted server according to an embodiment of the present disclosure. As shown in FIG. 11, the method 1100 includes the following operations.

Operation S1102: A service center receives a metric policy of at least one metric object and a verification policy of at least one verification object.

Operation S1104: If detecting that a metric algorithm of a metric object is inconsistent with a verification algorithm of a corresponding verification object, the service center sends reminder information to a trusted server, wherein the reminder information is used for reminding the trusted server to redeploy a metric algorithm and a verification algorithm that are consistent.

In implementations, the service center can be a cloud platform that centrally manages metric policies of a trusted server cluster (including at least one service trusted server used for providing different services). The trusted server can be any one trusted server in the trusted server cluster. The metric object can be a software object on the trusted server (for example, various types of system programs or software application programs), or a hardware object on the trusted server, (e.g., a kernel, a hard disk, etc.). Furthermore, different metric algorithms are deployed for different metric objects on trusted servers of different services. in addition, different metrics are deployed for different metrics on trusted servers of different services. The service center may receive a metric policy of at least one metric object and a verification policy of at least one verification object sent by any service trusted server in the trusted server cluster, and send reminder information used for reminding the trusted server to redeploy a metric algorithm and a verification algorithm that are consistent to the corresponding trusted server if a metric algorithm of a metric object and a verification algorithm of a corresponding verification object are detected to be inconsistent.

As can be seen from the above, in the foregoing embodiments of the present disclosure, using a manner of centralized deployment and management of trusted server policies, any one or more trusted servers in a trusted server cluster that deploy and manage policies through a service center that is based on cloud platform technologies can send a metric policy and a verification policy of one or more trusted software and hardware metric objects to the service center. When detecting that a metric algorithm of a trusted software and hardware metric object and a verification algorithm of a corresponding verification object are inconsistent, the service center reminds the trusted server to re-deploy a metric algorithm and a verification algorithm to maintain consistency.

It is easy to note that different metric algorithms are deployed for different metric objects on trusted servers of different services, so that the trusted servers of different services can flexibly and independently deploy metric policies and verification policies according to service requirements.

Through the solutions disclosed in the foregoing embodiments, the purpose of centralized management of automatic configuration of metric policies and verification policies of trusted software and hardware on multiple trusted servers is achieved, thus realizing technical effects of saving time and effort of service party of each service trusted server, and thereby solving the technical problems of poor independence and flexibility due to an employment of a same metric algorithm for all metric objects by existing trusted server policy management solutions.

Fifth Embodiment

An embodiment of a policy deployment method of a trusted server is also provided according to the embodiments of the present disclosure. The present embodiment may be applied to the policy deployment system of the trusted server in the second embodiment, which includes, but is not limited to the scenarios in the second embodiment. It should be noted that operations shown in a flowchart of an accompanying drawing may be executed in a computer system such as a set of computer executable instructions. Although a logical order is shown in the flowchart, in some cases, the operations may be performed in an order different from that shown or described herein.

Figure 12:
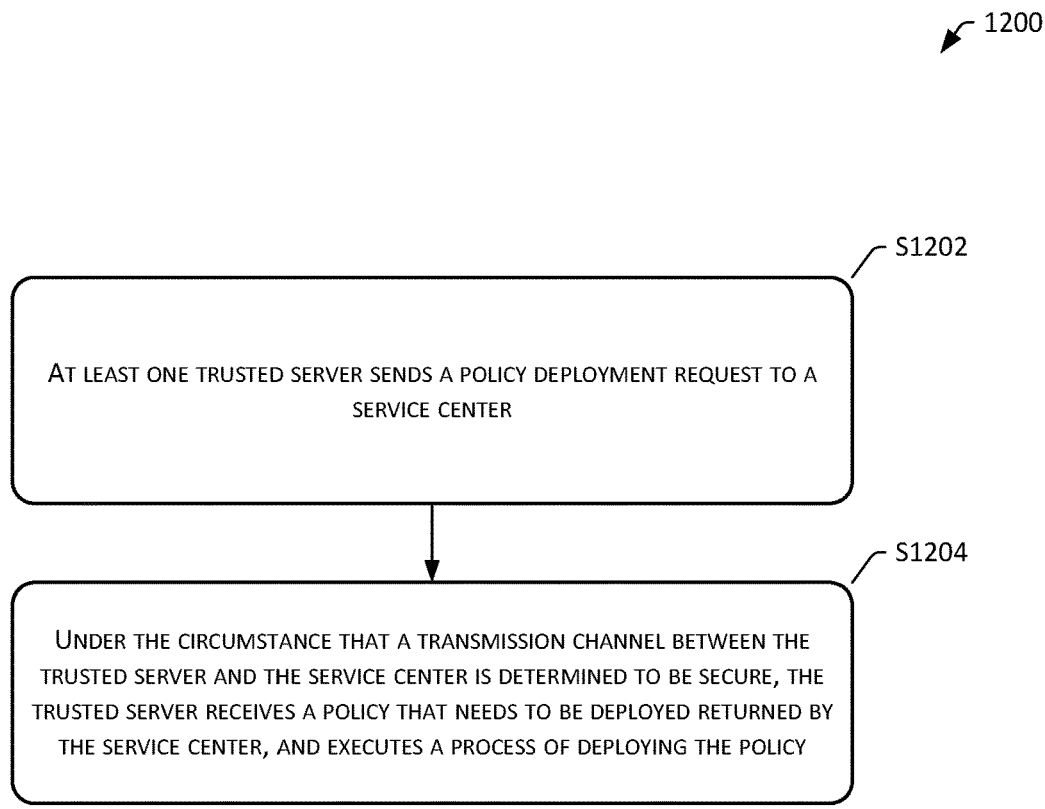
FIG. 12 is a flowchart of a policy deployment method of a trusted server in accordance with an embodiment of the present disclosure.

FIG. 12 is a flowchart of a policy deployment method 1200 of a trusted server according to an embodiment of the present disclosure. As shown in FIG. 12, the method 1200 includes the following operations.

Operation S1202: At least one trusted server sends a policy deployment request to a service center.

Operation S1204: Under the circumstance that a transmission channel between the trusted server and the service center is determined to be secure, the trusted server receives a policy that needs to be deployed returned by the service center, and executes a process of deploying the policy.

As an optional implementation, in the deployment process, the trusted server sends at least one metric policy and at least one verification policy to the service center. If a metric algorithm is inconsistent with a corresponding verification algorithm, the trusted server is reminded to redeploy a metric algorithm and a verification algorithm that are consistent.

In implementations, the at least one trusted server may be any one or more trusted servers in the trusted server cluster, and the service center may be a cloud platform that performs a centralized management of metric policies of any trusted server in the trusted server cluster. Any one or more trusted servers in the trusted server cluster send a policy deployment request to the service center, and receive polic(ies) that need(s) to be deployed from the service center in response to determining that transmission channel(s) with the service center is/are secure. It is easily noted that, if a metric algorithm and a verification algorithm sent by a trusted server in the trusted server cluster to the service center are inconsistent in a process of policy deployment, the service center can remind the trusted server to redeploy a metric algorithm and a verification algorithm that are consistent.

As can be seen from the above, in the foregoing embodiments of the present disclosure, using a manner of centralized deployment and management of trusted server policies, any one or more trusted servers in a trusted server cluster that deploy and manage policies through a service center that is based on cloud platform technologies can send a metric policy and a verification policy of one or more trusted software and hardware metric objects to the service center, and receive polic(ies) that need(s) to be deployed from the service center in response to determining that transmission channel(s) with the service center is/are secure. When detecting that a metric algorithm of a trusted software and hardware metric object of a certain trusted server and a verification algorithm of a corresponding verification object are inconsistent, the service center reminds the trusted server to re-deploy a metric algorithm and a verification algorithm to maintain consistency.

It is easy to note that different metric algorithms are deployed for different metric objects on trusted servers of different services, so that the trusted servers of different services can flexibly and independently deploy metric policies and verification policies according to service requirements.

Through the solutions disclosed in the foregoing embodiments, the purpose of centralized management of automatic configuration of metric policies and verification policies of trusted software and hardware on multiple trusted servers is achieved, thus realizing technical effects of saving time and effort of service party of each service trusted server, and thereby solving the technical problems of poor independence and flexibility due to an employment of a same metric algorithm for all metric objects by existing trusted server policy management solutions.

It should be noted that the foregoing method embodiments are all described as a series of action combinations for the sake of brevity. However, one skilled in the art should understand that the present disclosure is not limited by the described orders of actions because certain operations may be performed in other orders or in parallel according to the present disclosure. Moreover, one skilled in the art should also understand that the embodiments described in the specification are all preferred embodiments, and actions and modules that are involved may not be necessarily required by the present disclosure.

Through the description of the above embodiments, one skilled in the art can clearly understand that verification of a trusted server according to the above embodiments can be implemented through software plus a necessary general hardware platform, and apparently may also be through hardware. However, in many cases, the former is a better implementation. Based on such understanding, the essence of technical solutions of the present disclosure, or the parts that contribute to existing technologies, may be embodied in a form of a software product. The computer software product is stored in a storage media (such as ROM/RAM, a magnetic disk, an optical disc) which includes a number of instructions to cause a terminal device (which may be a mobile phone, a computer, a server, or a network device, etc.) to perform the methods described in various embodiments of the present disclosure.

Sixth Embodiment

Figure 13:
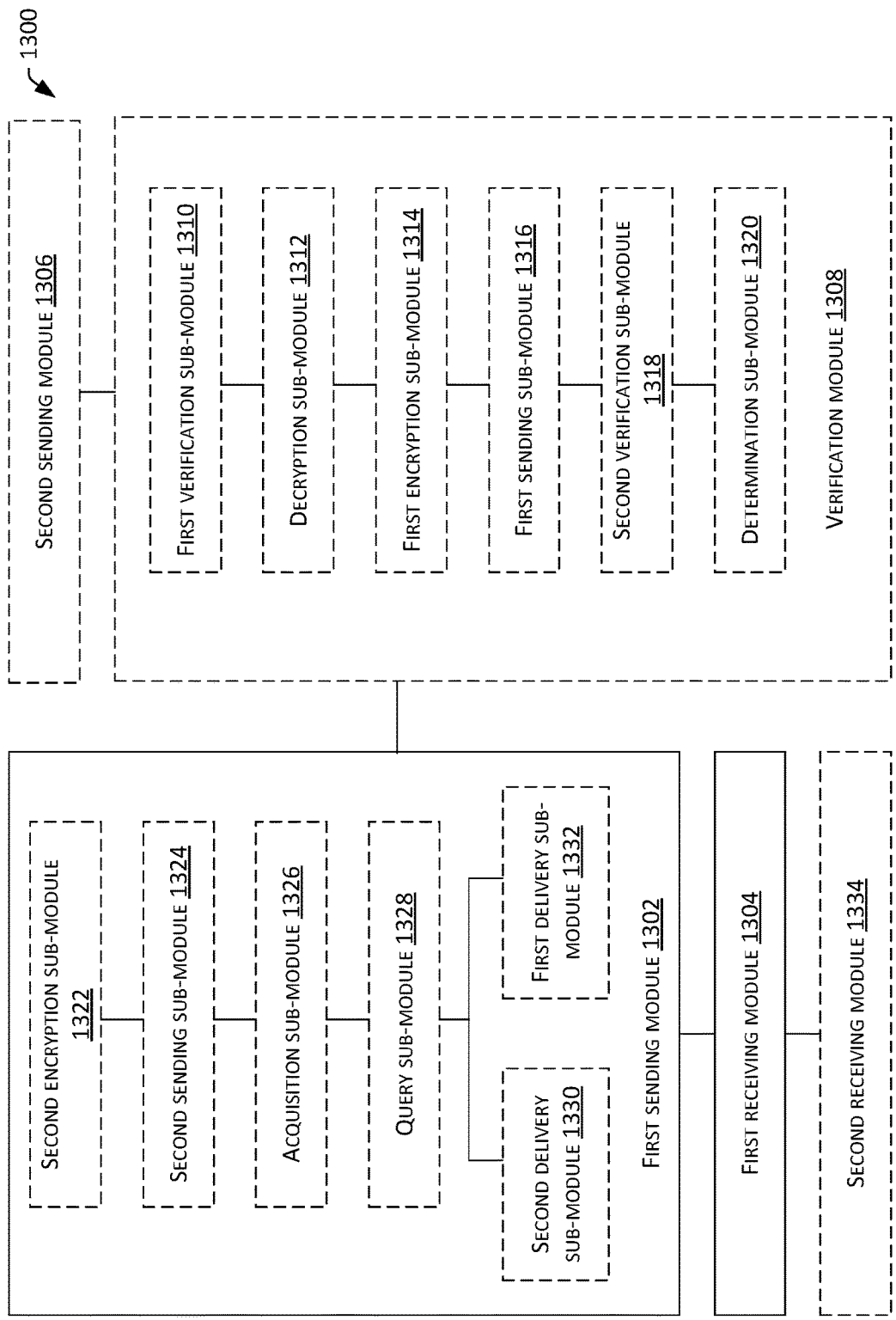
FIG. 13 is a schematic diagram of a policy deployment apparatus of a trusted server in accordance with an embodiment of the present disclosure.

According to the embodiments of the present disclosure, an embodiment of an apparatus for implementing the policy deployment method of the trusted server in the third embodiment as described above is further provided. FIG. 13 is a schematic diagram of a policy deployment apparatus 1300 of a trusted server according to an embodiment of the present disclosure. As shown in FIG. 13, the apparatus 1300 includes a first sending module 1302 and a first receiving module 1304.

The first sending module 1302 is configured to send a metric policy of at least one metric object and a verification policy of at least one verification object are sent to a service center.

The first receiving module 1304 is configured to receive reminder information returned by the service center, wherein the reminder information is used for representing a reminder to the trusted server to redeploy a metric algorithm and a verification algorithm that are consistent if detecting that a metric algorithm of a metric object is inconsistent with a verification algorithm of a corresponding verification object.

It should be noted herein that the first sending module 1302 and the first receiving module 1304 correspond to operations S602-S604 in the third embodiment. Examples and application scenarios implemented by the foregoing modules and corresponding operations are the same, and are not limited to the content disclosed by the third embodiment. It should be noted that the above modules, which act as a part of the apparatus, can be executed in a computer system such as a series of computer executable instructions.

As can be seen from the above, in the foregoing embodiments of the present disclosure, using a manner of centralized deployment and management of trusted server policies, any one or more trusted servers in a trusted server cluster that deploy and manage policies through a service center that is based on cloud platform technologies can send a metric policy and a verification policy of one or more trusted software and hardware metric objects to the service center. When detecting that a metric algorithm of a trusted software and hardware metric object and a verification algorithm of a corresponding verification object are inconsistent, the service center reminds the trusted server to re-deploy a metric algorithm and a verification algorithm to maintain consistency.

It is easy to note that different metric algorithms are deployed for different metric objects on trusted servers of different services, so that the trusted servers of different services can flexibly and independently deploy metric policies and verification policies according to service requirements.

Through the solutions disclosed in the foregoing embodiments, the purpose of centralized management of automatic configuration of metric policies and verification policies of trusted software and hardware on multiple trusted servers is achieved, thus realizing technical effects of saving time and effort of service party of each service trusted server, and thereby solving the technical problems of poor independence and flexibility due to an employment of a same metric algorithm for all metric objects by existing trusted server policy management solutions.

In implementations, the apparatus 1300 further includes a second sending module 1306 configured to send a service request to the service center, wherein a type of the service request includes at least one of the following: a policy query request, a policy deployment request, and a policy update request. When the service request is a policy deployment request, the trusted server obtains a policy that needs to be deployed through an access to the service center.

It should be noted herein that the second sending module 1306 corresponds to operations S702 in the third embodiment. Examples and application scenarios implemented by the foregoing module and corresponding operation are the same, and are not limited to the content disclosed by the third embodiment. It should be noted that the above module, which acts as a part of the apparatus, can be executed in a computer system such as a series of computer executable instructions.

In implementations, the apparatus 1300 further includes a verification module 1308 configured to verify the security of a transmission channel between the trusted server and the service center, wherein the operation of sending the metric policy of the at least one metric object and the verification policy of the at least one verification object to the service center is performed when the transmission channel is secure.

It should be noted herein that the verification module 1308 corresponds to operation S704 in the third embodiment. Examples and application scenarios implemented by the foregoing module and corresponding operation are the same, and are not limited to the content disclosed by the third embodiment. It should be noted that the above module, which acts as a part of the apparatus, can be executed in a computer system such as a series of computer executable instructions.

In implementations, the service request at least includes a public key of the trusted server, a first certificate, and a first random number that is encrypted using a public key of the service center. The verification module 1308 includes a first verification sub-module 1310 configured to receive the service request, and verify the validity of the first certificate; and a decryption sub-module 1312 configured to decrypt the encrypted first random number using a private key to obtain the first random number when the first certificate is verified to be valid.

It should be noted herein that the first verification sub-module 1310 and the first decryption sub-module 1312 correspond to operations S7041-S7042 in the third embodiment. Examples and application scenarios implemented by the foregoing modules and corresponding operations are the same, and are not limited to the content disclosed by the third embodiment. It should be noted that the above modules, which act as a part of the apparatus, can be executed in a computer system such as a series of computer executable instructions.

In implementations, the apparatus 1300 further includes a first encryption sub-module 1314 configured to encrypt a second random number that is modified from the first random number using the public key of the trusted server; and a first sending sub-module 1316 configured to send response information to the trusted server, wherein the response information includes at least the second random number and a second certificate of the service center.

It should be noted herein that the first encryption sub-module 1314 and the first sending sub-module 1316 correspond to operations S7043-S7044 in the third embodiment. Examples and application scenarios implemented by the foregoing modules and corresponding operations are the same, and are not limited to the content disclosed by the third embodiment. It should be noted that the above modules, which act as a part of the apparatus, can be executed in a computer system such as a series of computer executable instructions.

In implementations, the apparatus 1300 further includes a second verification sub-module 1318 configured to verify the second certificate, and verify the validity of the second random number; and a determination sub-module 1320 configured to determine that the transmission channel between the trusted server and the service center is secure under a condition that verification of the second certificate is successful, and/or the second random number is verified to be valid.

It should be noted herein that the second verification sub-module 1318 and the determination sub-module 1320 correspond to operations S7045-S7046 in the third embodiment. Examples and application scenarios implemented by the foregoing modules and corresponding operations are the same, and are not limited to the content disclosed by the third embodiment. It should be noted that the above modules, which act as a part of the apparatus, can be executed in a computer system such as a series of computer executable instructions.

In implementations, the first sending module 1302 includes a second encryption sub-module 1322 configured to encrypt the metric policy of the at least one metric object and the verification policy of the at least one verification object using a third random number, wherein the third random number is a result of modifying the second random number; and a second sending sub-module 1324 configured to send an encrypted result from the trusted server to the service center.

It should be noted herein that the second encryption sub-module 1322 and the second sending sub-module 1324 correspond to operations S6021-S6022 in the third embodiment. Examples and application scenarios implemented by the foregoing modules and corresponding operations are the same, and are not limited to the content disclosed by the third embodiment. It should be noted that the above modules, which act as a part of the apparatus, can be executed in a computer system such as a series of computer executable instructions.

In implementations, the apparatus 1300 further includes an acquisition sub-module 1326 configured to obtain the third random number, and decrypt the encrypted result using the third random number to obtain the metric policy of the at least one metric object and the verification policy of the at least one verification object; a query sub-module 1328 configured to query whether policies that are the same as a metric policy of any one or more metric objects and a verification policy of any one or more verification objects exist is made in a policy library; a first delivery sub-module 1330 configured to send found policies to the trusted server if the query is successful; and a second delivery sub-module 1332 configured to create new policies and send the new policies to the trusted server if the query fails.

It should be noted herein that the acquisition sub-module 1326, the query sub-module 1328, the first delivery sub-module 1330, and the second delivery sub-module 1332 correspond to operations S6023-S6026 in the third embodiment. Examples and application scenarios implemented by the foregoing modules and corresponding operations are the same, and are not limited to the content disclosed by the third embodiment. It should be noted that the above modules, which act as a part of the apparatus, can be executed in a computer system such as a series of computer executable instructions.

In implementations, the apparatus 1300 is further configured to use a modified random number to encrypt the found policies or the new policies, and send an encrypted result to the trusted server.

In implementations, the apparatus 1300 is further configured to use a modified random number to encrypt the found policies or the new policies to obtain an encrypted policy configuration file, and send the encrypted policy configuration file to the trusted server.

In implementations, the apparatus 1300 is further configured to decrypt the encrypted policy configuration file using the modified random number, and deploy the decrypted policy configuration file on the trusted server.

In implementations, the apparatus 1300 further includes a second receiving module 1334 configured to receive update information returned by the service center, wherein the update information is used for representing a reminder to the trusted server as to whether a metric policy needs to be updated when a change in hardware and software of the trusted server occurs.

Seventh Embodiment

Figure 14:
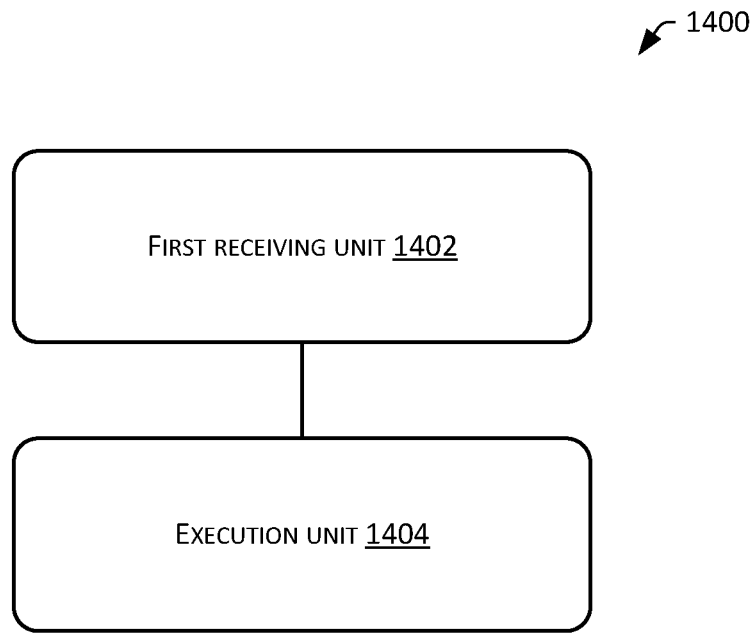
FIG. 14 is a schematic diagram of a policy deployment apparatus of a trusted server in accordance with an embodiment of the present disclosure.

According to the embodiments of the present disclosure, an embodiment of an apparatus for implementing the policy deployment method of the trusted server in the fourth embodiment as described above is further provided. FIG. 14 is a schematic diagram of a policy deployment apparatus 1400 of a trusted server according to an embodiment of the present disclosure. As shown in FIG. 14, the apparatus 1400 includes a first receiving unit 1402 and an execution unit 1404.

The first receiving unit 1402 is configured to receive a metric policy of at least one metric object and a verification policy of at least one verification object.

The execution unit 1404 is configured to send reminder information to a trusted server if detecting that a metric algorithm of a metric object is inconsistent with a verification algorithm of a corresponding verification object, wherein the reminder information is used for reminding the trusted server to redeploy a metric algorithm and a verification algorithm that are consistent.

It should be noted herein that the first receiving unit 1402 and the execution unit 1404 correspond to operations S1102-S1104 in the fourth embodiment. Examples and application scenarios implemented by the foregoing modules and corresponding operations are the same, and are not limited to the content disclosed by the fourth embodiment. It should be noted that the above modules, which act as a part of the apparatus, can be executed in a computer system such as a series of computer executable instructions.

As can be seen from the above, in the foregoing embodiments of the present disclosure, using a manner of centralized deployment and management of trusted server policies, the first receiving unit 1402 receives a metric policy and a verification policy of one or more trusted software and hardware metric objects from any one or more trusted servers in a trusted server cluster that deploy and manage policies. When detecting that a metric algorithm of a trusted software and hardware metric object and a verification algorithm of a corresponding verification object are inconsistent, the execution unit 1404 reminds a corresponding trusted server to re-deploy a metric algorithm and a verification algorithm to maintain consistency.

It is easy to note that different metric algorithms are deployed for different metric objects on trusted servers of different services, so that the trusted servers of different services can flexibly and independently deploy metric policies and verification policies according to service requirements.

Through the solutions disclosed in the foregoing embodiments, the purpose of centralized management of automatic configuration of metric policies and verification policies of trusted software and hardware on multiple trusted servers is achieved, thus realizing technical effects of saving time and effort of service party of each service trusted server, and thereby solving the technical problems of poor independence and flexibility due to an employment of a same metric algorithm for all metric objects by existing trusted server policy management solutions.

Eighth Embodiment

Figure 15:
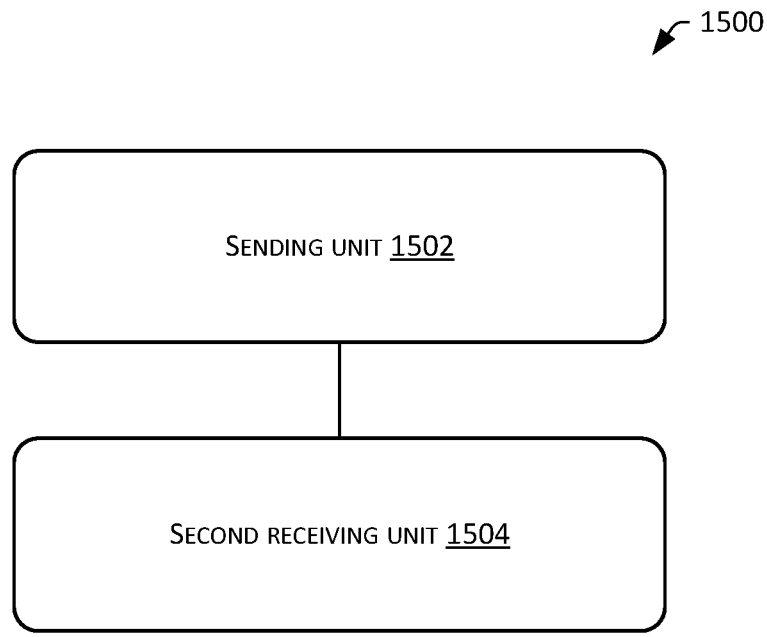
FIG. 15 is a schematic diagram of a policy deployment apparatus of a trusted server in accordance with an embodiment of the present disclosure.

According to the embodiments of the present disclosure, an embodiment of an apparatus for implementing the policy deployment method of the trusted server in the fifth embodiment as described above is further provided. FIG. 15 is a schematic diagram of a policy deployment apparatus 1500 of a trusted server according to an embodiment of the present disclosure. As shown in FIG. 15, the apparatus 1500 includes a sending unit 1502 and a second receiving unit 1504.

The sending unit 1502 is configured to send a policy deployment request to a service center.

The second receiving unit 1504 is configured to receive a policy that needs to be deployed and execute a process of deploying the policy when determining that a transmission channel between the trusted server and the service center is secure.

In implementations, the sending unit is further configured to send at least one metric policy and at least one verification policy to the service center during the process of deploying, and remind the trusted server to redeploy a metric algorithm and a verification algorithm that are consistent if a metric algorithm is inconsistent with a corresponding verification algorithm.

It should be noted herein that the first sending unit 1502 and the second receiving unit 1504 correspond to operations S1202-S1204 in the fifth embodiment. Examples and application scenarios implemented by the foregoing modules and corresponding operations are the same, and are not limited to the content disclosed by the fifth embodiment. It should be noted that the above modules, which act as a part of the apparatus, can be executed in a computer system such as a series of computer executable instructions.

As can be seen from the above, in the foregoing embodiments of the present disclosure, using a manner of centralized deployment and management of trusted server policies, the sending unit 1502 sends a metric policy and a verification policy of one or more trusted software and hardware metric objects to the service center. The second receiving unit 1504 receives polic(ies) that need(s) to be deployed from the service center through in response to determining that a transmission channel with the service center is secure. When detecting that a metric algorithm of a trusted software and hardware metric object of a certain trusted server and a verification algorithm of a corresponding verification object are inconsistent, the service center reminds the trusted server to re-deploy a metric algorithm and a verification algorithm to maintain consistency.

It is easy to note that different metric algorithms are deployed for different metric objects on trusted servers of different services, so that the trusted servers of different services can flexibly and independently deploy metric policies and verification policies according to service requirements.

Through the solutions disclosed in the foregoing embodiments, the purpose of centralized management of automatic configuration of metric policies and verification policies of trusted software and hardware on multiple trusted servers is achieved, thus realizing technical effects of saving time and effort of service party of each service trusted server, and thereby solving the technical problems of poor independence and flexibility due to an employment of a same metric algorithm for all metric objects by existing trusted server policy management solutions.

Ninth Embodiment

The embodiments of the present disclosure may provide a computing device. The computing device may be any computing device of a group of computing devices. Optionally, in the present embodiment, the foregoing computing device may also be replaced with a terminal device such as a computing device.

Optionally, in present embodiment, the foregoing computing device may be located in at least one access device of a plurality of network devices of a computer network.

Figure 16:
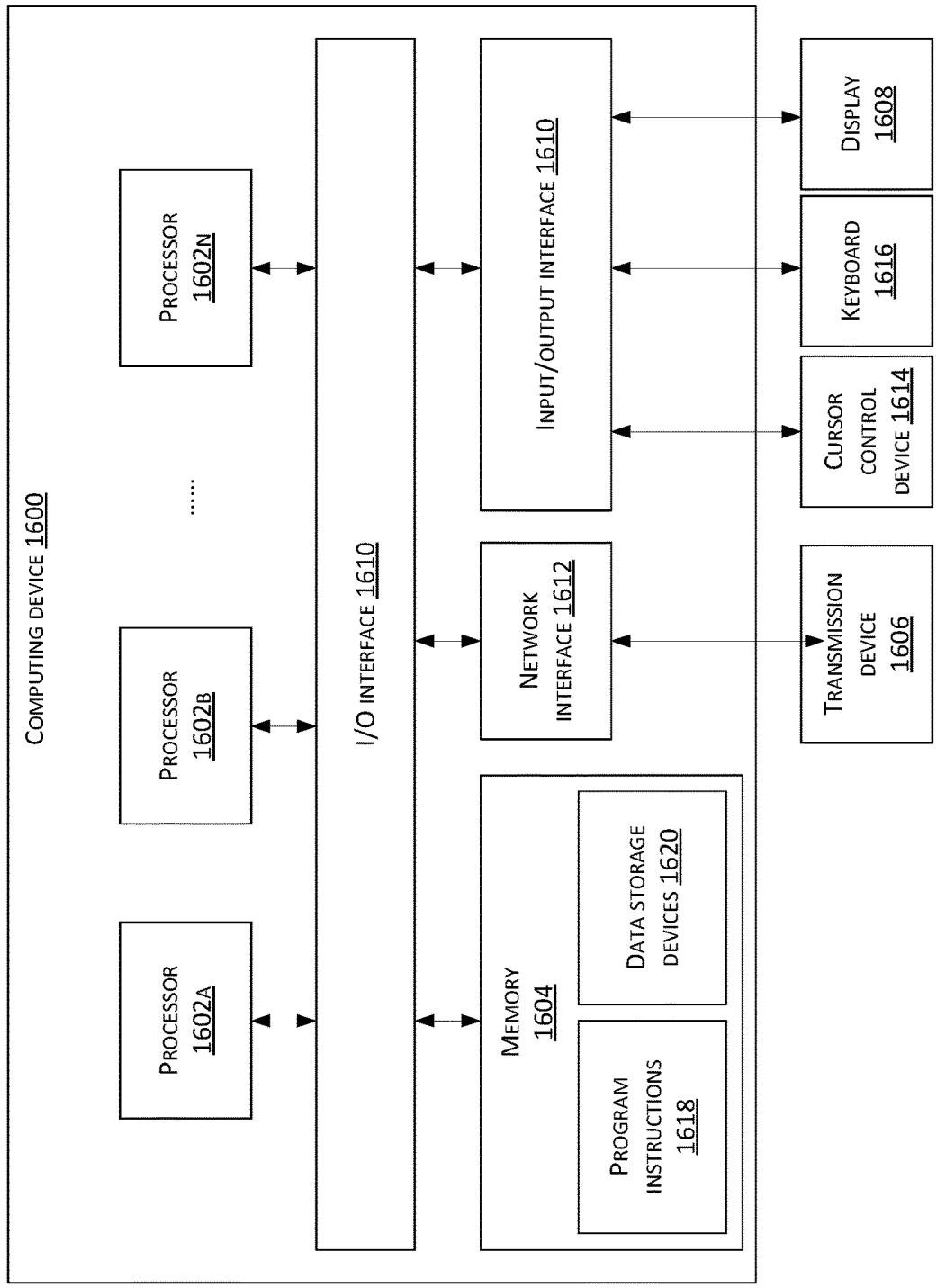
FIG. 16 is a block diagram showing a hardware structure of a computing device in accordance with an embodiment of the present disclosure.

FIG. 16 is a block diagram showing a hardware structure of a computing device. As shown in FIG. 16, the computing device 1600 may include one or more processors 1602A-N (the processor 1602 may include, but is not limited to, a processing device such as a microprocessor MCU or a programmable logic device FPGA), memory 1604 used for storing data, and a transmission device 1606 used for communication functions. In addition, a display 1608, an input/output interface (I/O interface) 1610, a network interface 1612, a cursor control device 1614, a keyboard 1616, a universal serial bus (USB) port (which can be included as one of the ports of the I/O interface), a power supply and/or a camera may also be included. One skilled in the art can understand that the structure shown in FIG. 16 is merely illustrative and does not limit the structure of the above electronic device. For example, the computing device 1600 may also include more or fewer components than those shown in FIG. 16, or have a different configuration than that shown in FIG. 16.

It should be noted that the hardware block diagram of the computing device or terminal shown in FIG. 16 can not only be used as an exemplary block diagram of the trusted server 201 in the first embodiment as described above, but also be used as an exemplary block diagram of the service center 203 as described above.

It should be noted that the one or more processor 1602 and/or other data processing circuits described above may be generally referred herein as to "data processing circuits". The data processing circuit may be embodied in whole or in part as software, hardware, firmware or any other combination. Moreover, the data processing circuit may be a single and independent processing module, or incorporated in whole or in part into any one of other components in the computing device 1600. As involved in the embodiments of the present disclosure, the data processing circuit is used as a processor control (e.g., a selection of a variable resistance terminal path connected to an interface).

The processor 1602 can call information and an application stored in the memory through the transmission device to perform the following operations: sending a metric policy of at least one metric object and a verification policy of at least one verification object in a process of policy deployment of a trusted server to a service center; the trusted server receiving reminder information returned by the service center, wherein the reminder information is used for representing a reminder to the trusted server to redeploy a metric algorithm and a verification algorithm that are consistent if a metric algorithm of a metric object is detected to be inconsistent with a verification algorithm of a corresponding verification object.

The memory 1604 can be used to store software programs and modules of application software, such as program instructions 1618/data storage devices 1620 corresponding to the method for policy deployment of a trusted server in the embodiments of the present disclosure. The processor 1602 performs various functional applications and data processing by running the software programs and the modules stored in the memory 1604, i.e., implementing the method for policy deployment of a trusted server of the above application program. The memory 1604 may include high speed random access memory, and may also include non-volatile memory such as one or more magnetic storage devices, flash memory, or other non-volatile solid state storage devices. In some examples, the memory 1604 may further include storage devices that are remotely located relative to the processor 1602. These remote storage devices can be connected to the computing device 1600 through a network. Examples of such network include, but are not limited to, the Internet, an intranet, a local area network, a mobile communication network, and a combination thereof.

The transmission device 1606 is used for receiving or transmitting data via a network. Specific examples of the network as described above may include a wireless network provided by a communication provider of the computing device 1600. In one example, the transmission device 1606 includes a Network Interface Controller (NIC), which can be connected to other network devices through a base station to communicate with the Internet. In one example, the transmission device 1606 can be a radio frequency (RF) module for communicating wirelessly with the Internet.

The display can be, for example, a touch screen of liquid crystal display (LCD). The liquid crystal display enables a user to interact with a user interface of the computing device 1600.

It should be noted that, in some optional embodiments, the computing device 1600 as shown in FIG. 16 above may include hardware components (including circuits), software components (including computer codes stored on computer readable media), or a combination of both hardware and software components. It should be noted that FIG. 16 is only one example of particular embodiments and is intended to illustrate types of components that may be present in the computing device 1600 described above.

It should be noted herein that, in some embodiments, the computing device shown in FIG. 16 described above has a touch display (also referred to as a "touch screen" or "touch display"). In some embodiments, the computing device shown in FIG. 16 has a graphical user interface (GUI), and a user can interact with the GUI by touching a finger contact and/or a gesture on a touch-sensitive surface. Human-machine interactive functions herein include the following interactions: creating web pages, drawing, word processing, creating electronic documents, games, video conferencing, instant messaging, sending and receiving electronic mails, calling interfaces, playing digital videos, playing digital music, and/or web browsing, etc. Executable instructions used for performing the human-computer interactive functions as described above are configured/stored in one or more processor-executable computer program products or readable storage media.

In the present embodiment, the computing device 1600 may execute program codes of the following operations in the method for policy deployment of a trusted server: sending a metric policy of at least one metric object and a verification policy of at least one verification object in a process of policy deployment of a trusted server to a service center; the trusted server receiving reminder information returned by the service center, wherein the reminder information is used for representing a reminder to the trusted server to redeploy a metric algorithm and a verification algorithm that are consistent if a metric algorithm of a metric object is detected to be inconsistent with a verification algorithm of a corresponding verification object.

Optionally, the processors may further execute program codes of the following operations: a trusted server sending a metric policy of at least one metric object and a verification policy of at least one verification object to a service center; the trusted server receiving reminder information returned by the service center, wherein the reminder information is used for representing a reminder to the trusted server to redeploy a metric algorithm and a verification algorithm that are consistent if a metric algorithm of a metric object is detected to be inconsistent with a verification algorithm of a corresponding verification object.

Optionally, the processors may further execute program codes of the following operations: sending a service request to the service center in the process of policy deployment of the trusted server, wherein a type of the service request includes at least one of the following: a policy query request, a policy deployment request, and a policy update request; and verifying the security of a transmission channel between the trusted server and the service center, wherein the operation of sending the metric policy of the at least one metric object and the verification policy of the at least one verification object by the trusted server to the service center is performed when the transmission channel is secure.

Optionally, the service request includes a public key of the trusted server, a first certificate, and a first random number encrypted using a public key of the service center, and the processors may further execute program codes of the following operations: verifying the security of the transmission channel between the trusted server and the service center includes the service center receiving the service request, and verifying the validity of the first certificate; and the service center decrypting the encrypted first random number using a private key to obtain the first random number when the first certificate is verified to be valid.

Optionally, the processors may further execute program codes of the following operations: the service center encrypting a second random number that is modified from the first random number using the public key of the trusted server; and the service center sending response information to the trusted server, wherein the response information includes at least the second random number and a second certificate of the service center.

Optionally, the processors may further execute program codes of the following operations: the trusted server verifying the second certificate, and verifying the validity of the second random number; and determining that the transmission channel between the trusted server and the service center is secure under a condition that verification of the second certificate is successful, and/or the second random number is verified to be valid.

Optionally, the processors may further execute program codes of the following operations: the trusted server encrypting the metric policy of the at least one metric object and the verification policy of the at least one verification object using a third random number, wherein the third random number is a result of modifying the second random number; and the trusted server sending an encrypted result to the service center.

Optionally, the processors may further execute program codes of the following operations: the service center obtaining the third random number, and decrypting the encrypted result using the third random number to obtain the metric policy of the at least one metric object and the verification policy of the at least one verification object; querying whether policies that are the same as a metric policy of any one or more metric objects and a verification policy of any one or more verification objects exist is made in a policy library; the service center sending found policies to the trusted server if the query is successful; and creating new policies and sending the new policies to the trusted server if the query fails.

Optionally, the processors may further execute program codes of the following operations: using a modified random number to encrypt the found policies or the new policies, and sending an encrypted result to the trusted server.

Optionally, the processors may further execute program codes of the following operations: using a modified random number to encrypt the found policies or the new policies to obtain an encrypted policy configuration file, and sending the encrypted policy configuration file to the trusted server.

Optionally, the processors may further execute program codes of the following operations: decrypting the encrypted policy configuration file using the modified random number, and deploying the decrypted policy configuration file on the trusted server.

Optionally, the processors may further execute program codes of the following operations: the trusted server receiving update information returned by the service center, wherein the update information is used for representing a reminder to the trusted server as to whether a metric policy needs to be updated when a change in hardware and software of the trusted server occurs.

Optionally, the processors may further execute program codes of the following operations: the service center receiving the metric policy of the at least one metric object and the verification policy of the at least one verification object; and the service center sending reminder information to the trusted server if detecting that a metric algorithm of a metric object is inconsistent with a verification algorithm of a corresponding verification object, wherein the reminder information is used for reminding the trusted server to redeploy the metric algorithm to maintain consistency with the verification algorithm.

One of ordinary skill in the art can understand that the structure shown in FIG. 16 is only schematic, and the computing device can also be a smart phone (such as an Android mobile phone, an iOS mobile phone, etc.), a tablet computer, a handheld computer, and a mobile Internet device (Mobile Internet Devices, MID), a PAD and other terminal devices. FIG. 16 does not limit the structure of the above electronic device. For example, the computing device 1600 may also include more or fewer components (such as a network interface, a display device, etc.) than those shown in FIG. 16, or have a configuration that is different from the one shown in FIG. 16.

One of ordinary skill in the art can understand that all or part of the operations of the foregoing embodiments may be completed by a program to instruct hardware related to a terminal device. The program may be stored in a computer readable storage media, and the storage media may include a flash disk, read-only memory (ROM), random access memory (RAM), a magnetic disk, or an optical disk.

Tenth Embodiment

The embodiments of the present disclosure also provide a storage media. Optionally, in the present embodiment, the storage media may be used for storing program codes executed by the method for policy deployment of a trusted server provided by the foregoing embodiment. When the program is run, a device in which the storage media is located is controlled to perform an optional or preferred method for policy deployment of a trusted server of any of the embodiments.

Optionally, in the present embodiment, the foregoing storage media may be located in any mobile terminal of a mobile terminal group in a computer network, or any mobile terminal of a mobile terminal group.

Optionally, in the present embodiment, the storage media is configured to store program codes for performing the following operations: sending a metric policy of at least one metric object and a verification policy of at least one verification object in a process of policy deployment of a trusted server to a service center; the trusted server receiving reminder information returned by the service center, wherein the reminder information is used for representing a reminder to the trusted server to redeploy a metric algorithm and a verification algorithm that are consistent if a metric algorithm of a metric object is detected to be inconsistent with a verification algorithm of a corresponding verification object.

Optionally, in the present embodiment, the storage media is configured to store program codes for performing the following operations: sending a service request to the service center in the process of policy deployment of the trusted server, wherein a type of the service request includes at least one of the following: a policy query request, a policy deployment request, and a policy update request, wherein the trusted server obtains a policy that needs to be deployed from the service center when the service request is the policy deployment request.

Optionally, in the present embodiment, the storage media is configured to store program codes for performing the following operations: verifying the security of a transmission channel between the trusted server and the service center, wherein the operation of sending the metric policy of the at least one metric object and the verification policy of the at least one verification object by the trusted server to the service center is performed when the transmission channel is secure.

Optionally, the service request includes at least a public key of the trusted server, a first certificate, and a first random number encrypted using a public key of the service center, in the present embodiment, the storage media is configured to store program codes for performing the following operations: the service center receiving the service request, and verifying the validity of the first certificate; and the service center decrypting the encrypted first random number using a private key to obtain the first random number when the first certificate is verified to be valid.

In the present embodiment, the storage media is configured to store program codes for performing the following operations: the service center encrypting a second random number that is modified from the first random number using the public key of the trusted server; and the service center sending response information to the trusted server, wherein the response information includes at least the second random number and a second certificate of the service center.

In the present embodiment, the storage media is configured to store program codes for performing the following operations: the trusted server verifying the second certificate, and verifying the validity of the second random number; and determining that the transmission channel between the trusted server and the service center is secure under a condition that verification of the second certificate is successful, and/or the second random number is verified to be valid.

In the present embodiment, the storage media is configured to store program codes for performing the following operations: the trusted server encrypting the metric policy of the at least one metric object and the verification policy of the at least one verification object using a third random number, wherein the third random number is a result of modifying the second random number; and the trusted server sending an encrypted result to the service center.

In the present embodiment, the storage media is configured to store program codes for performing the following operations: the service center obtaining the third random number, and decrypting the encrypted result using the third random number to obtain the metric policy of the at least one metric object and the verification policy of the at least one verification object; querying whether policies that are the same as a metric policy of any one or more metric objects and a verification policy of any one or more verification objects exist is made in a policy library; the service center sending found policies to the trusted server if the query is successful; and creating new policies and sending the new policies to the trusted server if the query fails.

In the present embodiment, the storage media is configured to store program codes for performing the following operations: using a modified random number to encrypt the found policies or the new policies, and sending an encrypted result to the trusted server.

In the present embodiment, the storage media is configured to store program codes for performing the following operations: using a modified random number to encrypt the found policies or the new policies to obtain an encrypted policy configuration file, and sending the encrypted policy configuration file to the trusted server.

In the present embodiment, the storage media is configured to store program codes for performing the following operations: decrypting the encrypted policy configuration file using the modified random number, and deploying the decrypted policy configuration file on the trusted server.

In the present embodiment, the storage media is configured to store program codes for performing the following operations: the trusted server receiving update information returned by the service center, wherein the update information is used for representing a reminder to the trusted server as to whether a metric policy needs to be updated when a change in hardware and software of the trusted server occurs.

In the present embodiment, the storage media is configured to store program codes for performing the following operations: the service center receiving the metric policy of the at least one metric object and the verification policy of the at least one verification object; and the service center sending reminder information to the trusted server if detecting that a metric algorithm of a metric object is inconsistent with a verification algorithm of a corresponding verification object, wherein the reminder information is used for reminding the trusted server to redeploy a metric algorithm.

In the present embodiment, the storage media is configured to store program codes for performing the following operations: at least one trusted server sending a policy deployment request to a service center; and the trusted server receiving a policy that needs to be deployed from the service center upon determining a transmission channel between the trusted server and the service center is secure, wherein the trusted server sends at least one metric policy and at least one verification policy to the service center, and if a metric algorithm and a verification algorithm are not consistent, the trusted server is reminded to redeploy a metric algorithm and a verification algorithm that are consistent.

Eleventh Embodiment

The embodiments of the present disclosure provide a policy deployment system of a trusted server, which includes processor(s); and memory coupled to the processor(s) and configured to provide the processor(s) with instructions to process the following operations: sending a metric policy of at least one metric object and a verification policy of at least one verification object to a service center in a process of policy deployment of a trusted server; the trusted server receiving reminder information returned by the service center, wherein the reminder information is used for representing a reminder to the trusted server to redeploy a metric algorithm and a verification algorithm that are consistent if a metric algorithm of a metric object is detected to be inconsistent with a verification algorithm of a corresponding verification object.

As can be seen from the above, in the foregoing embodiments of the present disclosure, using a manner of centralized deployment and management of trusted server policies, any one or more trusted servers in a trusted server cluster that deploy and manage policies through a service center that is based on cloud platform technologies can send a metric policy and a verification policy of one or more trusted software and hardware metric objects to the service center. When detecting that a metric algorithm of a trusted software and hardware metric object and a verification algorithm of a corresponding verification object are inconsistent, the service center reminds the trusted server to re-deploy a metric algorithm and a verification algorithm to maintain consistency.

It is easy to note that different metric algorithms are deployed for different metric objects on trusted servers of different services, so that the trusted servers of different services can flexibly and independently deploy metric policies and verification policies according to service requirements.

Through the solutions disclosed in the foregoing embodiments, the purpose of centralized management of automatic configuration of metric policies and verification policies of trusted software and hardware on multiple trusted servers is achieved, thus realizing technical effects of saving time and effort of service party of each service trusted server, and thereby solving the technical problems of poor independence and flexibility due to an employment of a same metric algorithm for all metric objects by existing trusted server policy management solutions.

Twelfth Embodiment

Figure 17:
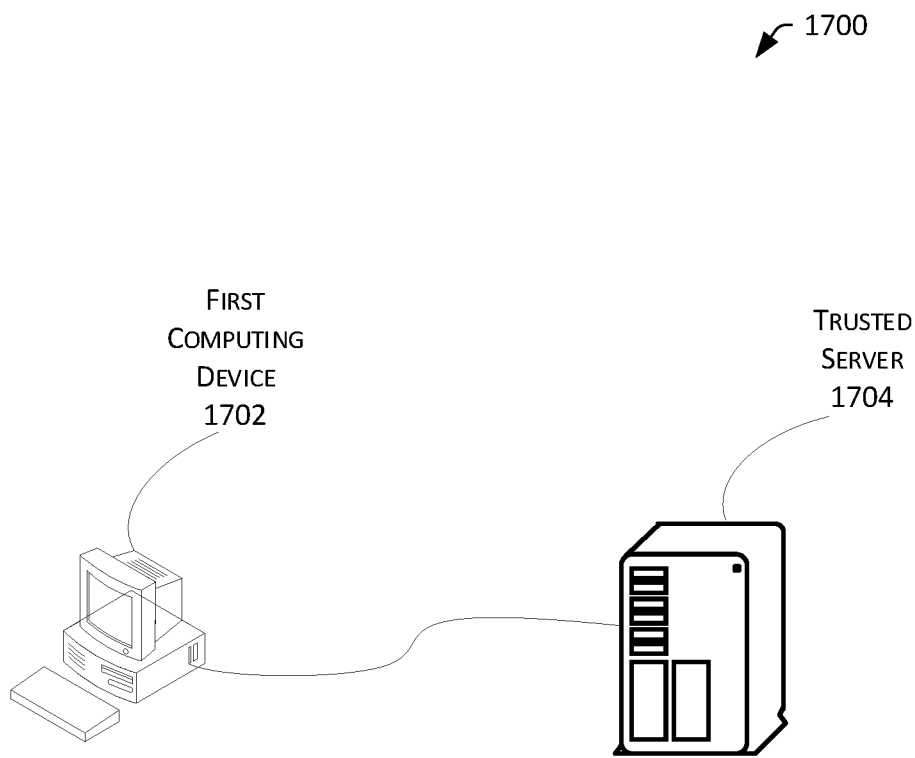
FIG. 17 is a schematic diagram of a computing system in accordance with an embodiment of the present disclosure.

According to the embodiments of the present disclosure, an embodiment of a computing system used for implementing the policy deployment method of the trusted server in the foregoing third, fourth and fifth embodiments is also provided. FIG. 17 is a schematic diagram of a computing system 1700 according to an embodiment of the present disclosure. As shown in FIG. 17, the computing system 1700 includes a first computing device 1702 and a trusted server 1704, wherein the trusted server 1704 coupled to the first computing device, is configured to send a deployment request to the first computing device, and receive a policy that needs to be deployed from the first computing device 1702 and executes a deployment of the policy upon determining that a transmission channel between the trusted server 1704 and the first computing device 1702 is secure.

In implementations, the foregoing first computing device 1702 may be a device used for managing metric policies of the trusted server 1704, including but not limited to a computer, etc. The first computing device 1702 is coupled to the trusted server. When the trusted server 1704 (optionally, the trusted server may be any trusted server of a trusted server cluster) needs to deploy a policy, the trusted server 1704 sends a deployment request to the first computing device 1702, receives the policy that needs to be deployed from the first computing device 1702, and deploys the policy upon determining a transmission channel between the trusted server 1704 and the first computing device is secure 1702.

As can be seen from the above, in the foregoing embodiments of the present disclosure, a first computing device coupled to a trusted server performs policy deployment and management for any one or more trusted servers in a trusted server cluster, and the trusted server sends a deployment request to the first computing device. In response to determining that a transmission channel between the trusted server and the first computing device is secure, the first computing device sends deployed content (including a deployed policy) to the trusted server, and the trusted server deploys the policy after receiving the policy that needs to be deployed from the first computing device.

It is easy to note that different metric algorithms are deployed for different metric objects on trusted servers of different services, so that the trusted servers of different services can flexibly and independently deploy metric policies and verification policies according to service requirements.

Through the solutions disclosed in the foregoing embodiments, the purpose of centralized management of automatic configuration of metric policies and verification policies of trusted software and hardware on multiple trusted servers is achieved, thus realizing technical effects of saving time and effort of service party of each service trusted server, and thereby solving the technical problems of poor independence and flexibility due to an employment of a same metric algorithm for all metric objects by existing trusted server policy management solutions.

In implementations, the trusted server uses any one of the following chips: a TPM security chip, a TPCM security chip, and a TCM security chip.

In implementations, the foregoing deployment request includes at least a public key of the trusted server, a first certificate, and a first random number encrypted using the public key, wherein the first computing device is further configured to verify the security of the transmission channel between the trusted server and the first computing device according to the deployment request.

In implementations, the first computing device receives the deployment request, and verifies the validity of the first certificate. In response to verifying that the first certificate is valid, the first computing device decrypts the encrypted first random number using a private key pair to obtain the first random number, encrypts a second random number that is modified from the first random number using the public key of the trusted server, and transmits response information to the trusted server, wherein the response information includes at least the second random number and a second certificate of the first computing device. The trusted server is further configured to verify the second certificate and verify the validity of the second random number, and determine that a transmission channel between the trusted server and the first computing device is secure if verification of the second certificate is successful, and/or the second random number is verified to be valid.

In implementations, the trusted server is further configured to send a metric policy of the at least one metric object and a verification policy of the at least one verification object in a process of policy deployment. The first computing device is further configured to send reminder information is sent to the trusted server if a metric algorithm of the metric object is inconsistent with a verification algorithm of the corresponding verification object, wherein the reminder information is used to remind the trusted server to redeploy a metric algorithm and a verification algorithm that are consistent.

Figure 18:
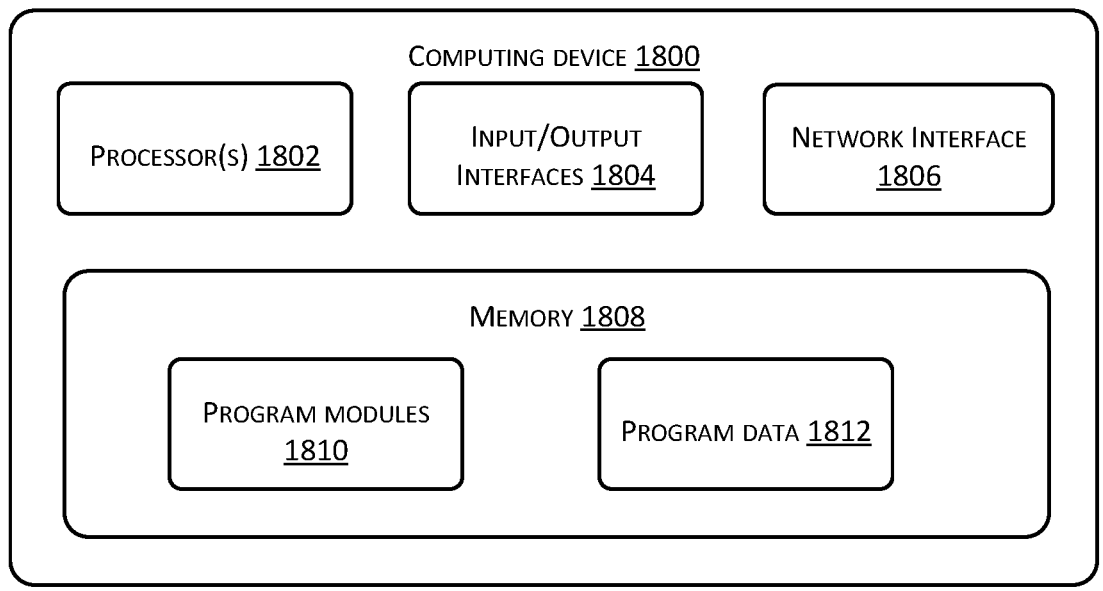
FIG. 18 is a schematic diagram of the server, apparatus and/or system as described in FIGS. 1, 4 and 13-17 in further detail.

FIG. 18 shows a schematic diagram of an example system 1800. The system 1800 may be the server 104 or 402, the service center 404, the apparatus 1300, 1400 or 1500, the computing device 1600, or the computing system 1700 as described in FIGS. 1, 4 and 13-17 in further detail. In implementations, the system 1800 may include one or more processors 1802, an input/output (I/O) interface 1804, a network interface 1806, and memory 1808.

The memory 1808 may include a form of computer readable media such as a volatile memory, a random access memory (RAM) and/or a non-volatile memory, for example, a read-only memory (ROM) or a flash RAM. The memory 1808 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 1808 may include program modules 1810 and program data 1812. Depending on which the system 1800 represents, the program modules 1810 may include one or more of the modules/sub-modules/units as described in the foregoing description and figures.

Sequence numbers of the embodiments of the present disclosure are merely used for description, and do not represent the qualities of the embodiments.

In the foregoing embodiments of the present disclosure, descriptions of various embodiments are different, and the parts that are not detailed in a certain embodiment can be referred to related descriptions of other embodiments.

In a number of embodiments provided by the present disclosure, it should be understood that the disclosed technical content may be implemented in other manners. The device embodiments described above are only schematic. For example, a division of units is only a logical division of functions. In practical implementations, other manners of division can exist. For example, multiple units or components may be combined or may be integrated into another system, or some features can be ignored or not executed. In addition, mutual coupling or direct coupling or communication connection that is shown or discussed may be an indirect coupling or communication connection through some interfaces, units or modules, and may be in an electrical or other form.

Units that are described as separate components may or may not be physically separated, and components displayed as units may or may not be physical units, i.e., may be located in one place, or may be distributed among multiple network units. Some or all of the units may be selected according to actual needs to achieve the purpose of the solutions of the embodiments.

In addition, various functional units in each embodiment of the present disclosure may be integrated into a single processing unit. Alternatively, each unit may exist as a physical entity separately. Alternatively, two or more units may be integrated into one unit. The above integrated unit can be implemented in a form of hardware or in a form of a software functional unit.

The integrated unit, if implemented in a form of a software functional unit and sold or used as a standalone product, may be stored in a computer readable storage media. Based on such understanding, the essence of the technical solutions of the present disclosure, the contributions to existing technologies, or all or part of the technical solutions may be embodied in a form of a software product. The computer software product is stored in a storage media, and includes a number of instructions to cause a computing device (which may be a personal computer, a server, or a network device, etc.) to perform all or part of the operations of the methods described in various embodiments of the present disclosure. The foregoing storage media includes a U disk, Read-Only Memory (ROM), Random Access Memory (RAM), a removable hard disk, a magnetic disk, or an optical disk, etc.

The above description is only preferred embodiments of the present disclosure. It should be noted that one of ordinary skill in the art can also make a number of improvements and polishing without departing from the principles of the present disclosure. These and polishing should be considered to be within the scope of protection of the present disclosure.

The present disclosure can be further understood using the following clauses.

Clause 1: A policy deployment system of a trusted server, comprising: a trusted server configured to send a metric policy of at least one metric object and a verification policy of at least one verification object; and a service center configured to communicate with the trusted server, and send reminder information to the trusted server if detecting that a metric algorithm of a metric object is inconsistent with a verification algorithm of a corresponding verification object, wherein the reminder information is used for reminding the trusted server to redeploy a metric algorithm and a verification algorithm that are consistent.

Clause 2: The system of Clause 1, wherein the trusted server is further configured to send a service request to the server center, wherein types of the service request include at least a policy query request, a policy deployment request, and a policy update request, and wherein the trusted server obtains a policy that needs to be deployed by accessing the service center.

Clause 3: The system of Clause 2, wherein the service center is further configured to verify security of a transmission channel between the trusted server and the service center according to the service request.

Clause 4: The system of Clause 1, wherein the service center monitors changes in software and hardware components of the trusted server, and returns a reminder about update information of whether to update the metric policy to the trusted server when a change in the software and hardware components of the trusted server occurs.

Clause 5: A policy deployment method of a trusted server, comprising: sending a metric policy of at least one metric object and a verification policy of at least one verification object in a process of policy deployment of a trusted server to a service center; and the trusted server receiving reminder information returned by the service center, wherein the reminder information is used for representing a reminder to the trusted server to redeploy a metric algorithm and a verification algorithm that are consistent if a metric algorithm of a metric object is detected to be inconsistent with a verification algorithm of a corresponding verification object.

Clause 6: The method of Clause 5, wherein: prior to sending the metric policy of the at least one metric object and the verification policy of the at least one verification object to the service center, the method further comprises: the trusted server sending a service request to the service center, wherein a type of the service request includes at least one of the following: a policy query request, a policy deployment request, and a policy update request, and wherein the trusted server obtains a policy that needs to be deployed by accessing the service center when the service request is the policy deployment request.

Clause 7: The method of Clause 6, wherein: after the trusted server sends the service request to the service center, the method further comprises verifying security of a transmission channel between the trusted server and the service center, wherein the operation of sending the metric policy of the at least one metric object and the verification policy of the at least one verification object by the trusted server to the service center is performed when the transmission channel is secure.

Clause 8: The method of Clause 7, wherein the service request comprises at least a public key of the trusted server, a first certificate, and a first random number encrypted using a public key of the service center, wherein verifying the security of the transmission channel between the trusted server and the service center comprises: the service center receiving the service request, and verifying validity of the first certificate; and the service center decrypting the encrypted first random number using a private key to obtain the first random number when the first certificate is verified to be valid.

Clause 9: The method of Clause 8, wherein: after the first random number is obtained by decrypting the encrypted first random number using the private key in the service center, the method further comprises: the service center encrypting a second random number that is modified from the first random number using the public key of the trusted server; and the service center sending response information to the trusted server, wherein the response information includes at least the second random number and a second certificate of the service center.

Clause 10: The method of Clause 9, wherein: after the service center sends the response information to the trusted server, the method further comprises: the trusted server verifying the second certificate, and verifying validity of the second random number; and determining that the transmission channel between the trusted server and the service center is secure when verification of the second certificate is successful, and/or the second random number is verified to be valid.

Clause 11: The method of Clause 10, wherein sending the metric policy of the at least one metric object and the verification policy of the at least one verification object by the trusted server to the service center is performed when the transmission channel is secure comprises: the trusted server encrypting the metric policy of the at least one metric object and the verification policy of the at least one verification object using a third random number, wherein the third random number is a result of modifying the second random number; and the trusted server sending an encrypted result to the service center.

Clause 12: The method of Clause 11, wherein: after the trusted server sends the encrypted result to the service center, the method further comprises: the service center obtaining the third random number, and decrypting the encrypted result using the third random number to obtain the metric policy of the at least one metric object and the verification policy of the at least one verification object; querying whether policies that are the same as a metric policy of any one or more metric objects and a verification policy of any one or more verification objects exist is made in a policy library; the service center sending found policies to the trusted server if the query is successful; and creating new policies and sending the new policies to the trusted server if the query fails.

Clause 13: The method of Clause 12, wherein a modified random number is used to encrypt the found policies or the new policies, and an encrypted result is sent to the trusted server.

Clause 14: The method of Clause 12 or 13, wherein a modified random number is used to encrypt the found policies or the new policies to obtain an encrypted policy configuration file, and the encrypted policy configuration file is sent to the trusted server.

Clause 15: The method of Clause 14, wherein the encrypted policy configuration file is decrypted using the modified random number, and the decrypted policy configuration file is deployed on the trusted server.

Clause 16: The method of Clause 5, wherein the trusted server further receives update information returned by the service center, wherein the update information is used for representing a reminder to the trusted server as to whether a metric policy needs to be updated when a change in hardware and software of the trusted server occurs.

Clause 17: A policy deployment method of a trusted server, comprising: a service center receiving a metric policy of at least one metric object and a verification policy of at least one verification object; and the service center sending reminder information to a trusted server if detecting a metric algorithm of a metric object is inconsistent with a verification algorithm of a corresponding verification object, wherein the reminder information is used for reminding the trusted server to redeploy a metric algorithm and a verification algorithm that are consistent.

Clause 18: A policy deployment method of a trusted server, comprising: at least one trusted server sending a policy deployment request to a service center; and the trusted server receiving a policy that needs to be deployed from the service center and performing a process of deploying the policy upon determining a transmission channel between the trusted server and the service center is secure.

Clause 19: The method of Clause 18, wherein the trusted server sends the metric policy of the at least one metric object and the verification policy of the at least one verification object to the service center in the process of deployment, and if a metric algorithm is inconsistent with a verification algorithm, the trusted server is reminded to redeploy the metric algorithm to maintain consistency with the verification algorithm.

Clause 20: A policy deployment system of a trusted system, comprising: a trusted server configured to send a policy deployment request to a service center; and the service center configured to communicate with the trusted server, and return a policy that needs to be deployed to the trusted server upon determining that a transmission channel between the trusted server and the service center is secure, wherein the trusted server is further configured to send a metric policy of at least one metric object and a verification policy of at least one verification object during a process of deployment, and the service center is further configured to send reminder information to the trusted server if a metric algorithm of a metric object is inconsistent with a verification algorithm of a corresponding verification object, wherein the reminder information is used for reminding the trusted server to redeploy the metric algorithm to maintain consistency with the verification algorithm.

Clause 21: A storage media, the storage media comprising a stored program, wherein the program, when being run, control a device in which the storage media is located to perform the policy deployment method of the trusted server of any one of Clauses 5-19.

Clause 22: A computing device, the computing device being used for running a program, wherein the program, when being run, performs the policy deployment method of the trusted server of any one of Clauses 5-19.

Clause 23: A policy deployment system of a trusted system, comprising: processor(s); and memory coupled to the processor(s) and configured to provide the processor(s) with instructions to process the following operations: sending a metric policy of at least one metric object and a verification policy of at least one verification object from a trusted server to a service center; and the trusted server receiving reminder information returned by the service center, wherein the reminder information is used for representing a reminder to the trusted server to redeploy a metric algorithm and a verification algorithm that are consistent if a metric algorithm of a metric object is detected to be inconsistent with a verification algorithm of a corresponding verification object.

Clause 24: A policy deployment system of a trusted system, comprising: a service center; and at least one trusted server, which is connected to the service center, and is used for sending a policy deployment request to the service center, receiving a policy that needs to be deployed from the service center upon determining a transmission channel between the trusted server and the service center is secure, and performing a process of deploying the policy.

Clause 25: A computing system comprising: a first computing device; and a trusted server coupled to the first computing device and configured to send a deployment request to the first computing device, receive a policy that needs to be deployed from the first computing device upon determining that a transmission channel between the trusted server and the first computing device is secure, and perform a deployment of the policy.

Clause 26: The computing system of Clause 25, wherein the trusted server uses any one of the following chips: a TPM security chip, a TPCM security chip, and a TCM security chip.

Clause 27: The computing system of Clause 26, wherein the deployment request comprises at least a public key of the trusted server, a first certificate, and a first random number encrypted using the public key, wherein the first computing device is further configured to verify the security of the transmission channel between the trusted server and the first computing device according to the deployment request.

Clause 28: The computing system of Clause 27, wherein the first computing device receives the deployment request, verifies the validity of the first certificate, decrypts the encrypted first random number using a private key pair to obtain the first random number in response to verifying that the first certificate is valid, encrypts a second random number that is modified from the first random number using the public key of the trusted server, and transmits response information to the trusted server, wherein the response information includes at least the second random number and a second certificate of the first computing device, wherein the trusted server is further configured to verify the second certificate and verify the validity of the second random number, and determine that a transmission channel between the trusted server and the first computing device is secure if verification of the second certificate is successful, and/or the second random number is verified to be valid.

Clause 29: The computing system of Clause 25, wherein the trusted server is further configured to send a metric policy of the at least one metric object and a verification policy of the at least one verification object in a process of policy deployment, and the first computing device is further configured to send reminder information is sent to the trusted server if a metric algorithm of the metric object is inconsistent with a verification algorithm of the corresponding verification object, wherein the reminder information is used to remind the trusted server to redeploy the metric algorithm and the verification algorithm that are consistent.

What is claimed is:

1. A method implemented by a trusted server, the method comprising:
    sending a service request to a service center, wherein a type of the service request includes a policy query request, a policy deployment request, or a policy update request;
    sending a metric policy of at least one metric object and a verification policy of at least one verification object to the service center;
    receiving reminder information returned by the service center, the reminder information representing a reminder to the trusted server to redeploy a metric algorithm and a verification algorithm that are consistent if a metric algorithm of the at least one metric object is detected to be inconsistent with a verification algorithm of the at least verification object; and
    receiving update information returned by the service center, wherein the update information is used for representing the reminder to the trusted server as to whether a metric policy needs to be updated when a change in hardware and software of the trusted server occurs.

2. The method of claim 1, wherein obtaining a policy that needs to be deployed by accessing the service center in response to the service request being the policy deployment request.

3. The method of claim 1, further comprising:
    verifying security of a transmission channel between the trusted server and the service center after the service request is sent to the service center, wherein sending the metric policy of the at least one metric object and the verification policy of the at least one verification object to the service center is performed when the transmission channel is secure.

4. The method of claim 3, wherein the service request comprises at least a public key of the trusted server, a first certificate, and a first random number encrypted using a public key of the service center.

5. The method of claim 4, wherein sending the service request to the service center allows the service center to verify validity of the first certificate, and to decrypt the encrypted first random number using a private key of the service center to obtain the first random number when the first certificate is verified to be valid.

6. The method of claim 5, further comprising:
    receiving response information from the service center, response information comprising at least a second random number encrypted using the public key of the trusted server and a second certificate of the service center, the second random number being a random number that is obtained by modifying the first random number.

7. The method of claim 6, further comprising:
    verifying the second certificate, and verifying validity of the second random number; and
    determining that the transmission channel between the trusted server and the service center is secure in response to verification of the second certificate being successful, and/or the second random number being verified to be valid.

8. The method of claim 7, wherein sending the metric policy of the at least one metric object and the verification policy of the at least one verification object to the service center when the transmission channel is secure comprises:
    encrypting the metric policy of the at least one metric object and the verification policy of the at least one verification object using a third random number, wherein the third random number is a result of modifying the second random number; and
    sending an encrypted result to the service center.

9. One or more computer readable media storing executable instructions that, when executed by one or more processors of a service center, cause the one or more processors to perform acts comprising:
    receiving a service request from the trusted server, a type of the service request comprising a policy query request, a policy deployment request, or a policy update request;
    receiving metric policies of one or more metric objects and verification policies of one or more verification objects from the trusted server;
    sending reminder information to the trusted server in response to detecting a metric algorithm of a metric object is inconsistent with a verification algorithm of a corresponding verification object, the reminder information reminding the trusted server to redeploy a metric algorithm and a verification algorithm that are consistent; and
    sending update information to the trusted server, wherein the update information is used for representing the reminder to the trusted server as to whether a metric policy needs to be updated when a change in hardware and software of the trusted server occurs.

10. The one or more computer readable media of claim 9, wherein the acts further comprise:
    verifying security of a transmission channel between the trusted server and the service center according to the service request.

11. The one or more computer readable media of claim 10, wherein the service request comprises at least a public key of the trusted server, a first certificate, and a first random number encrypted using a public key of the service center, and
    wherein verifying the security of the transmission channel between the trusted server and the service center comprises:
    verifying validity of the first certificate; and
    decrypting the encrypted first random number using a private key to obtain the first random number when the first certificate is verified to be valid.

12. A computing system comprising:
a first computing device; and
a trusted server coupled to the first computing device, the trusted server comprising:
one or more server processors, and
server memory coupled to the one or more server processors, the server memory storing executable instructions that, when executed by the one or more server processors, cause the one or more server processors to perform server acts comprising:
sending a deployment request to the first computing device;
receiving a policy that needs to be deployed from the first computing device upon determining that a transmission channel between the trusted server and the first computing device is secure;
sending a service request to the first computing device, wherein a type of the service request includes a policy query request, a policy deployment request, or a policy update request; and
sending a metric policy of at least one metric object and a verification policy of at least one verification object in a process of policy deployment,
wherein the first computing device comprises:
one or more device processors; and
device memory coupled to the one or more device processors; the device memory storing executable instructions that, when executed by one or more device processors, cause the one or more device processors to perform device acts comprising:
sending reminder information to the trusted server if a metric algorithm of the metric object is inconsistent with a verification algorithm of the corresponding verification object, the reminder information reminding the trusted server to redeploy the metric algorithm and the verification algorithm that are consistent; and
sending update information to the trusted server, wherein the update information is used for representing the reminder to the trusted server as to whether a metric policy needs to be updated when a change in hardware and software of the trusted server occurs.

13. The computing system of claim 12, wherein the trusted server further comprises one of:
a TPM security chip,
a TPCM security chip, or
a TCM security chip.

14. The computing system of claim 13, wherein:
the deployment request comprises at least a public key of the trusted server, a first certificate, and a first random number encrypted using the public key, and
the device acts further comprise:
verifying the security of the transmission channel between the trusted server and the first computing according to the deployment request.

15. The computing system of claim 14, wherein:
the device acts further comprise:
receiving the deployment request;
verifying the validity of the first certificate;
decrypting the encrypted first random number using a private key pair to obtain the first random number in response to verifying that the first certificate is valid;
encrypting a second random number that is modified from the first random number using the public key of the trusted server; and
transmitting response information to the trusted server, wherein the response information includes at least the second random number and a second certificate of the first computing device, and
the server acts further comprise:
verifying the second certificate;
verifying the validity of the second random number; and
determining that a transmission channel between the trusted server and the first computing device is secure if at least one of:
verification of the second certificate is successful, or the second random number is verified to be valid.

* * * * *